US012060085B2

(12) United States Patent
Di Cairano et al.

(10) Patent No.: US 12,060,085 B2
(45) Date of Patent: Aug. 13, 2024

(54) SYSTEM AND METHOD FOR CONTROLLING AUTONOMOUS VEHICLE IN UNCERTAIN ENVIRONMENT

(71) Applicant: Mitsubishi Electric Research Laboratories, Inc., Cambridge, MA (US)

(72) Inventors: Stefano Di Cairano, Newton, MA (US); Angelo Domenico Bonzanini, Berkley, CA (US); Ali Mesbah, Berkley, CA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 215 days.

(21) Appl. No.: 17/805,376

(22) Filed: Jun. 3, 2022

(65) Prior Publication Data
US 2023/0391373 A1 Dec. 7, 2023

(51) Int. Cl.
*B60W 30/09* (2012.01)
*B60W 50/00* (2006.01)
*B60W 60/00* (2020.01)

(52) U.S. Cl.
CPC ........ *B60W 60/0027* (2020.02); *B60W 30/09* (2013.01); *B60W 50/0097* (2013.01);
(Continued)

(58) Field of Classification Search
CPC ............. B60W 60/0027; B60W 30/09; B60W 50/0097; B60W 2554/4046; B60W 2050/0022
(Continued)

(56) References Cited

U.S. PATENT DOCUMENTS 7,167,799 B1 * 1/2007 Dolgov .................. G08G 1/164
701/469
9,568,915 B1 * 2/2017 Berntorp .................. G06N 5/01
(Continued)

FOREIGN PATENT DOCUMENTS

KR          20040033141         *    4/2004

OTHER PUBLICATIONS

Angelo D. Bonzanini, Perception-Aware Chance-Constrained Model Predictive Control for Uncertain Environments, May 28, 2021, 2021 American Control Conference (ACC) (Year: 2021).*
(Continued)

*Primary Examiner* — Elaine Gort
*Assistant Examiner* — Matthias S Weisfeld
(74) *Attorney, Agent, or Firm* — Gene Vinokur; Hironori Tsukamoto

(57) ABSTRACT

The present disclosure provides a controller for controlling an ego vehicle in an uncertain environment. The controller is caused to acquire knowledge of the environment from measurements associated with sensors the ego. The measurements are based on a state of the ego vehicle and sensing instructions associated with controlling an operation of the sensors. The controller is further caused to estimate a state of the environment, including uncertainty of a state of the at least one moving object or obstacle in the environment. Further a sequence of control inputs is determined by solving a multivariable and a multistage stochastic constrained optimization of a model of the motion of the ego vehicle. The controller is then caused to control the ego vehicle and the sensors based on the sequence of control inputs and the sequence of sensing instructions.

20 Claims, 25 Drawing Sheets

(52) U.S. Cl.
CPC ............... *B60W 2050/0022* (2013.01); *B60W 2554/4046* (2020.02)

(58) Field of Classification Search
USPC .......................................................... 701/26
See application file for complete search history.

(56) References Cited

U.S. PATENT DOCUMENTS

| | | | |
|---|---|---|---|
| 11,017,289 B2* | 5/2021 | Crawford | G06N 7/01 |
| 11,921,506 B2* | 3/2024 | Wray | B60W 30/18159 |
| 2011/0054793 A1* | 3/2011 | Harada | G08G 1/096725 |
| | | | 701/301 |
| 2018/0025291 A1* | 1/2018 | Dey | G06N 7/01 |
| | | | 706/11 |
| 2020/0298859 A1* | 9/2020 | Ozay | G08G 1/167 |
| 2021/0007023 A1* | 1/2021 | Umapathy | H04W 36/00837 |
| 2022/0026921 A1* | 1/2022 | Halder | B60W 60/00 |

OTHER PUBLICATIONS

Tim Brudigam, Grid-Based Stochastic Model Predictive Control for Trajectory Planning in Uncertain Environments, 2020, IEEE 2020 International Conference on Intelligent Transportation Systems (Year: 2020).*
Multistage Stochastic Programs, 2021 (Year: 2021).*
Vasileios Lefkopoulos, Chance-Constrained Programming for Autonomous Vehicles in Uncertain Environments, Jun. 27, 2018, ETH Zurich (Year: 2018).*
Bonzanino et al. "Multi Stage Perception aware Chance Constrained MPC with Applications to Automated Driving," 2022 ACC, Jun. 8, 2022. pp. 1697-1702.

\* cited by examiner $$N_B < N$$

Branching Prediction
Horizon Horizon

FIG. 11A

SYSTEM AND METHOD FOR CONTROLLING AUTONOMOUS VEHICLE IN UNCERTAIN ENVIRONMENT

TECHNICAL FIELD

This present disclosure relates generally to control strategies for autonomous vehicles, and more specifically to control operations for autonomous vehicles in an uncertain environment.

BACKGROUND

Autonomous vehicles, such as automated vehicles, unmanned aerial vehicles (UAVs) or drones, automated ground vehicles, warehouse mobile robots and the like, often operate in environments that are only approximately known. Such vehicles have to accomplish one or more assigned control goals and that needs to be done while avoiding unsafe events that may be due to the operation of the vehicles in the environment. For example, one such unsafe event is colliding of a vehicle with an obstacle or leaving a specifically marked area or a safe region of navigation. This is particularly challenging since the environment is not known exactly, both due to lack of prior information on it, and due to the environment changing over time, e.g., other vehicles on the road traversed by an autonomous vehicle are also moving.

To that end, information on the environment can be acquired through sensing, using sensors in the vehicle itself or sensors in the environment which are connected to the vehicle via communication networks, which increases the knowledge of the environment. This knowledge, though increased as compared to knowledge without sensors, yet provides only approximate knowledge, due to sensors noise and limited capabilities of the sensors (such as in terms of their resolution, range, and the like). Also, the sensors can acquire information about the current environment of the vehicle only. For instance, one objective of an automated car is to reach its target destination without colliding with other vehicles and while remaining within a road of travel by staying within the appropriate lane markings. The location of other cars and road marking is not known a priori but can be acquired from sensors, such as radar, sonar, lidar, etc., as long as the different objects are in the range of the sensors and the line-of-sight of the sensors. These sensors can be internal or external to the automated car. For example, the sensors can be arranged on the vehicles or at road-side units (RSU).

In another example, a warehouse robot transports certain parts to a workbench while staying in the assigned corridor to avoid endangering human workers, and while avoiding collisions with other robots and materials in the warehouse. As human workers and materials move through the warehouse, their locations change in an unknown way, but this can be acquired from sensors onboard the robot, such as lidar and sonar, as long as the different objects are in the range and the line-of-sight of the sensors, or even relayed to the robot from sensors placed on the environment, as long as the robot is in the communication range of the sensors.

It may be realized to those skilled in the art that the amount of information that is acquired on a specific object in the environment depends on the amount of sensing such an object is subjected to. That is to say, the more an object is observed using a sensor, the more information on the object is acquired, that is, the greater is the knowledge on the object state. Thus, information acquisition on an object in the environment for increasing its knowledge is a dynamic process.

On the other hand, the amount of information on the environment that is acquired via the sensors often depends on how an object acquiring this knowledge, or an observer is operated. For instance, if the observer is an autonomous vehicle, then an object can be appropriately discovered and observed, only if it is in the range of the sensors for observing it, and if there is a free line-of-sight between the sensor placed on the autonomous vehicle and the object. Thus, if the autonomous vehicle is operated in such a way that the object stays more in the range and the line-of-sight of the sensor, the amount of information acquired on the object is greater, and the knowledge of the object state will be more precise. Also, the amount of information can increase while the range reduces, and hence if the autonomous vehicle is controlled closer to the object, more information is acquired. However, going too close to the assumed position of the object, such as an obstacle before enough knowledge on its actual position is available may present some risks.

To that end, if the motion of the autonomous vehicle is determined solely based on the available knowledge, the need to avoid unsafe events caused by the partially unknown environment may cause the motion of the autonomous vehicle to be overly cautious and stay on the most known path, which may result in degraded performance, e.g., longer time to reach the goal, more energy used, etc. On the other hand, if the motion of the autonomous vehicle is determined to acquire the most information on the environment, the motion of the autonomous vehicle may deviate significantly from that needed to achieve the control goal resulting in an overall degradation of performance, e.g., not reaching the goal, reaching the goal with significant delay.

A further problem in such motion planning scenarios is that to plan the motion of the autonomous vehicle, it will be necessary to predict not only the motion of the autonomous vehicle itself, but also the acquired information according to such motion. However, predicting the acquired information is challenging, because it depends on how the environment will change during the prediction. This in itself is hard to do.

Some existing solutions known in the art disclose a method for controlling an autonomous vehicle in an uncertain environment discovered by sensing where the operation of the autonomous vehicle affects the sensing and the amount of future uncertainty of the environment based on sensing actions is predicted. However, such prior art does not disclose how to include the prediction of the future measurements into the decision-making problem which results in either possibly unsafe future operation or the need to choose a conservative plan which reduces the performance. Furthermore, the prior art does not disclose a method that can be used for planning the motion of an autonomous vehicle because the prior art includes only linear constraints, that are convex, while autonomous vehicles require collision avoidance with obstacles, which is known to result in non-convex constraints.

Thus, there is a need for a control method that determines the optimal operation of an autonomous vehicle while avoiding collisions and other unsafe events due to the interaction with the environment that is uncertain but discovered by sensing.

SUMMARY

To that end, some embodiments provide a solution where the future information acquired on the environment is predicted to plan the future motion of the autonomous vehicle that is safe and achieves high performance.

Some embodiments consider a controller for controlling an autonomous vehicle operating in a partially unknown environment discovered through sensing. The control objective is for the autonomous vehicle to achieve a given goal, such as reaching a specific state or tracking a given reference signal, while ensuring the safety of the autonomous vehicle with respect to the operating requirements and its interaction with the environment.

Examples of such autonomous vehicles include autonomous vehicles, as well as aerospace vehicles and mobile or manipulator robots, for which the motion and dynamics models are available, but that are acting in an environment that is not completely known. For instance, the uncertainty of the environment may be due to the presence of other actors, such as other cars or people, whose position and motion are not known a priori, but can be discovered using sensors such as cameras, lidars, or radars. Safety is ensured by controlling the autonomous vehicle such that its motion satisfies operating specifications, such as limits on velocities, accelerations, and forces. Safe interaction with the environment is ensured by controlling the autonomous vehicle such that it does not collide with other actors, e.g., other cars or people, and it remains in the area where it is proper for it to stay, e.g., the proper lane on the road or pre-defined workspace. Since the knowledge about other actors and possibly also the area of the motion is not complete, ensuring safe interaction may not be completely certain, but it can be rendered more certain by acquiring more information from sensors which increases knowledge on those.

For autonomous vehicles operating according to the definitions and examples above, the commands issued by the control depend on the amount of knowledge available in the environment. For instance, the control may want to avoid areas where there is no knowledge in order to avoid undetected risks. On the other hand, also the sensing depends on how the control operates the autonomous vehicle through its commands. For instance, how close the autonomous vehicle is to an area determines how well such an area is sensed. As another example, the controller may decide in real-time the amount of processing done on the data sensed on a certain area, which can increase or decrease the amount of information extracted from sensors. Thus, there is a circular interdependence between sensing and control. However, the overall aim of the controller is to achieve a specific control objective for the autonomous vehicle. Hence, the sensing objective is secondary to the control objective, as it does not motivate the operation of the autonomous vehicle by itself, although it affects it.

In some known solutions existing in the art, the impact of sensing on the uncertainty in the environment has been considered, such as being represented for instance by covariance of position estimates around the mean. However, these known solutions do not disclose how to account for the effect of sensing on the prediction of the information on the environment, that is, the mean around which the covariance is centered.

To that end, some embodiments are based on a recognition that for achieving the control objective with high performance in the uncertain environment, it is not sufficient to predict how the information acquired from sensing affects the uncertainty (the covariance) about the environment estimate, but it is necessary also to predict the specific measurements that will be acquired on the environment that affect the information of the environment estimated itself (the mean).

Some embodiments are further based on a realization that one the environment state can be represented by stochastic vectors with a first and second moment (mean and covariance). Further, it is possible to predict the evolution of the uncertainty on the environment estimate by predicting the evolution of the estimate covariance based on predicted control actions of the vehicle that affect a model of the estimation algorithm using the sensor data.

Some embodiments are further based on a recognition that it is also possible to predict the estimate of the environment by predicting the mean of the measurements according to a multi-stage approach where a mean is predicted for each admissible behavior of the other actors in the environment, with their own probability. This results in a set of possible trajectories for the mean of the measurements that will be acquired on the environment, according to the different behaviors that the environment may exhibit, and as a consequence a set of possible trajectories for the estimate of the environment actors.

Some embodiments are further based on a realization that by embedding the multi-stage prediction of the measurements on the environment into a multi-stage optimization problem, it may be possible to obtain a control command for the autonomous vehicle that accounts for the effect of sensing on the uncertainty on the environment, as well as for the effect of future measurements on the estimate of the environment, for the possible behavior of the actors included in the environment.

Further, some embodiments are also based on a realization that to provide general collision avoidance behavior for the autonomous vehicle, it is necessary to convexify the non-convex constraints of the collision avoidance while retaining their uncertainty information. This may be done by determining a hyperplane separating the space occupied by an obstacle from the free space that the autonomous vehicle can occupy, and then combining such separating hyperplane with the uncertainty of the environment to obtain probabilistic constraints that provide guaranteed collision avoidance with a user-defined confidence level.

To that end, some embodiments disclose a method for controlling autonomous vehicles in an environment that is not known a priori but discovered via sensing, wherein the control method accounts for the impact of the actions taken by the autonomous vehicle on sensing, and accounts for the impact of sensing on both the uncertainty in the knowledge of the surrounding environment, and the prediction of the behavior of the actors in the surrounding environment.

The method realizes an interdependent but imbalanced, control, and sensing in which the control is a primary objective and the sensing is the secondary one, while accounting for both the impact of the sensing upon the environment uncertainty and the impact of sensing on the prediction of the behavior of the actors in the environment. That is achieved by computing the control action as the solution of a multi-stage multivariable optimization problem wherein each stage corresponds to a future time step where the autonomous vehicle can be controlled, and the elements in the stages correspond to different measurements associated to different discrete behaviors executed by actors in the environment at each of the future time steps.

Some embodiments predict different measurements of the actors in the environments in the multistage optimization problem, and as a consequence determine the control to the autonomous vehicle according to such predictions of measurements.

Some embodiments first predict behaviors of the actors in the environment, then predict the measurement according to each possible behavior and as a consequence determine the control to the autonomous vehicle according to such predictions of behavior of the actors in the environment as seen according to measurements of the actors in the environment.

Some embodiments include in the multi-stage problem, probabilistic constraints, where the uncertainty in such probabilistic constraints is the predicted reliability of the estimate of the environment. The reliability of the estimate of the environment is computed using a model of the estimator that can be constructed based on dynamical equations or autonomous vehicle learning models.

To this end, some embodiments include a convexification of the probabilistic constraints for avoiding moving actors, such as vehicles or people, that is obtained by constructing a separating hyperplane for the area where the obstacle is predicted to reside, at any future time instant according to the prediction of the measurement in the multi-stage optimization problem, and combining the separating hyperplane with the predicted uncertainty of the estimate to obtain probabilistic convex constraints.

According to an embodiment, a controller for controlling an ego vehicle in an environment surrounding the ego vehicle and including at least one moving object is provided. The controller comprises at least one processor; and memory having instructions stored thereon that, when executed by the at least one processor, cause the controller to acquire knowledge of the environment from measurements of at least one sensor of the ego vehicle sensing the environment. The measurements of the at least one sensor are based on at least one of: a state of the ego vehicle, and sensing instructions associated with controlling an operation of the sensor. The controller is further configured to process the acquired knowledge of the environment to estimate a state of the environment, the state of the environment including a state of the at least one moving object and uncertainty of the state of the environment including uncertainty of the state of the at least one moving object. The controller is further configured to determine jointly, a sequence of control inputs for controlling the ego vehicle, the sequence of control inputs defining a state trajectory of the ego vehicle; and a sequence of sensing instructions to the sensor defining a desired knowledge of the environment. The sequence of control inputs are determined by solving a multistage stochastic constrained optimization of a model of the motion of the ego vehicle, the model of the motion relating the state trajectory with the sequence of control inputs subject to chance constraints on admissible values of the states of the ego vehicle and the control inputs to the ego vehicle defined based on the desired knowledge of the environment caused by at least some possible transitions of the state of the at least one moving object at different stages of the stochastic constrained optimization and corresponding uncertainties of the transitioned states of the moving object in the acquired knowledge. The controller is further configured to control the ego vehicle and the sensor based on the sequence of control inputs and the sequence of sensing instructions. The controller is also configured to predict possible future measurements of one or more other moving objects in the environment; and to determine possible future transitions of the states of the at least one moving object using the predicted possible future measurements of the one or more other moving objects.

In some embodiments, the multivariable and the multistage stochastic constrained optimization is obtained by conditioning the future transitions of the ego vehicle to the predicted possible future measurements of one or more other moving objects in the environment.

BRIEF DESCRIPTION OF THE DRAWINGS

FIG. 11A-FIG. 11B illustrate a scenario tree including non-anticipativity constraints used by the controller for constructing the optimization problem in presence of conditioning to possible predicted future measurements where the conditioning to possible predicted future measurements is done only along a branching horizon shorter than the prediction horizon, according to an embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on.

Further, it is to be understood that the phraseology and terminology employed herein are for the purpose of the description and should not be regarded as limiting. Any heading utilized within this description is for convenience only and has no legal or limiting effect The present disclosure provides systems and methods for control of an object, such as an ego vehicle which may be an autonomous vehicle, in an uncertain environment which is not known a-priori but is discoverable by sensing. The systems and methods disclosed herein provide a multi-stage Perception-aware Chance-constrained Model Predictive Control (PAC-MPC) formulation that does not require an overly-conservative estimate of measurement prediction error covariance. For example, the systems and methods disclosed herein may be used in a controller that is configured to control of an automated vehicle in situations where obstacles and road boundaries are uncertain and perceived by variable precision sensors subject to an overall sensing budget, and where the scenarios are generated based on possible obstacle future behaviors.

There often exists an interdependence between perception and control: the perception of the environment depends on how the ego vehicle is controlled, and the control of the ego vehicle depends on the environment information acquired by the vehicle. The systems and methods disclosed herein are able to leverage this interdependence and provide a solution for control of the objects in an uncertain environment in a robust, efficient, and accurate manner. Further, the realization of the solution is also based on consideration of computational constraints on sensing and prediction, thus providing a computationally effective solution for MPC in a controller designed for a task. The systems and methods are also applied to machines, operating in uncertain environments, without deviating from the scope of the present disclosure, wherein such machines may include robots, for example.

Figure 1A:
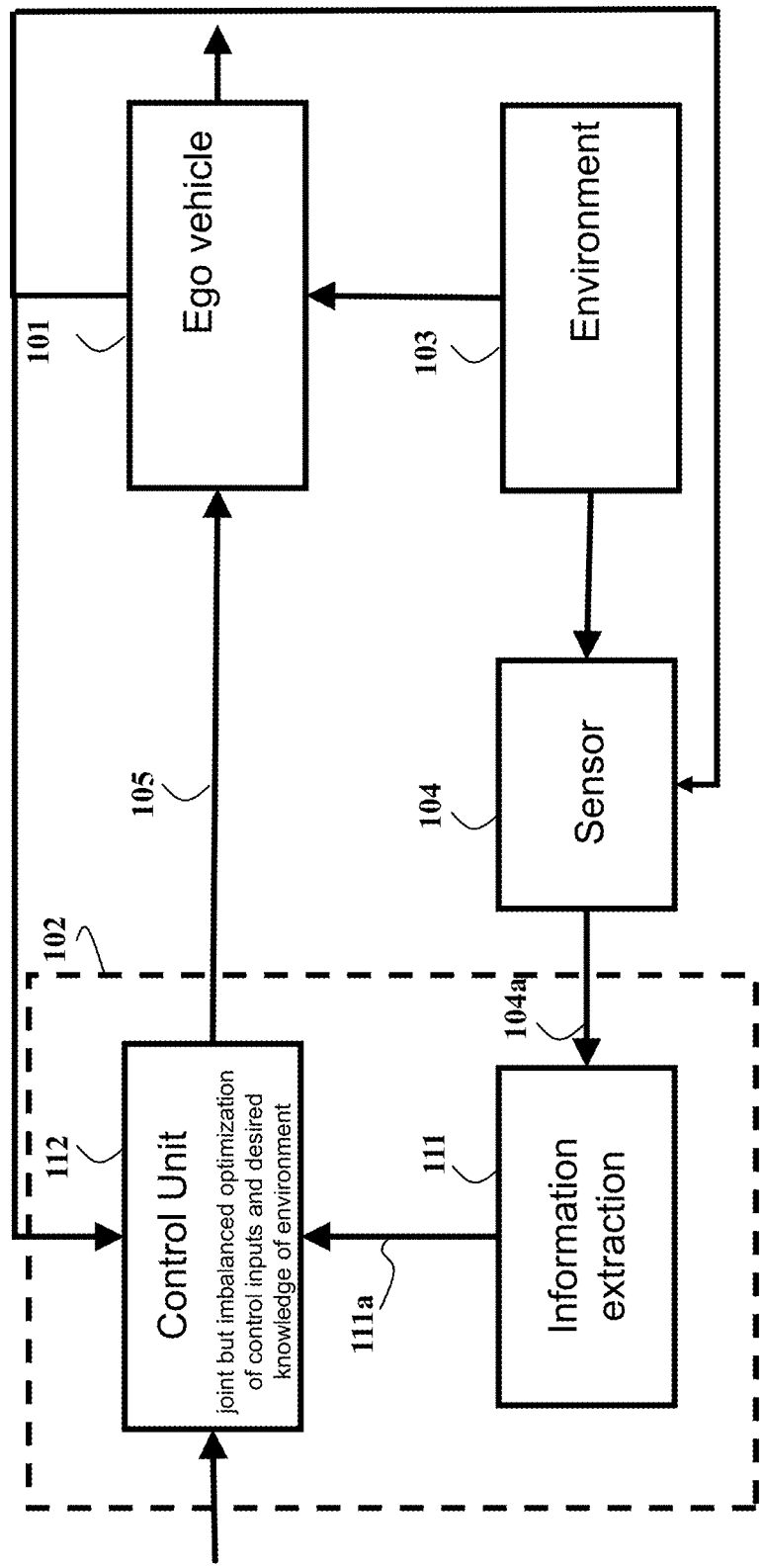
FIG. 1A illustrates a general architecture of a controller for controlling an ego vehicle operating in an environment, according to an embodiment of the present disclosure.

FIG. 1A illustrates a general architecture of a controller for controlling an autonomous vehicle operating in an environment, according to an embodiment of the present disclosure.

An ego vehicle 101, that may be an autonomous vehicle, is controlled by a controller 102 and is operating in an environment 103 surrounding the ego vehicle 101 that affects the operation of the ego vehicle 101 and can be discovered by sensing. The behavior of the ego vehicle 101 in response to one or more commands issued by controller 102 is assumed to be known. The environment in which the ego vehicle 101 operates is not perfectly known apriori, but information and knowledge of the environment 103 can be acquired from measurements of at least one sensor 104 placed on or remotely connected to the ego vehicle 101. In practice there may be more than one sensor onboard the ego vehicle, without deviating from the scope of the present disclosure.

The controller 102 contains an information extraction 111 on the data of the environment 103 obtained from the at least one sensor 104. The information extraction 111 causes the controller 102 to acquire 111a knowledge of the environment 103 and uses that information together with known information on the ego vehicle 101 in a control unit 112 to compute commands 105 for controlling the ego vehicle 101 to achieve a control objective while ensuring safety with respect to the ego vehicle 101 operational requirements and the interaction with the environment 103. To that end, the data of the environment 103 comprises knowledge about the environment 103, as derived based on measurements 104a of the at least one sensor 104 sensing the environment 103.

This sensing is based on at least one of a state of the ego vehicle 101 and sensing instructions for controlling the operation of the at least one sensor 104.

The controller 102 is configured to determine an optimal operation of the ego vehicle 101, while avoiding unsafe events caused by the environment 103 that is not known a priori, and hence uncertain, but can be discovered by sensing. Further, the information acquisition capability of the sensing depends in turn on how the ego vehicle 101 is operated such that the acquiring of information does not prevent the ego vehicle 101 of achieving its goal or degrade its performance in achieving the goal.

Some embodiments are based on a recognition that the sensing objective is secondary to the control objective, as it does not motivate the operation of the ego vehicle 101 by itself, although it affects it. To that end, some embodiments disclose interdependent but imbalanced, control, and sensing applications in which the control is a primary objective and the sensing is the secondary one.

To that end, the control unit 112 performs joint but unbalanced optimization of control inputs 105 and desired knowledge of the environment.

Figure 1B:
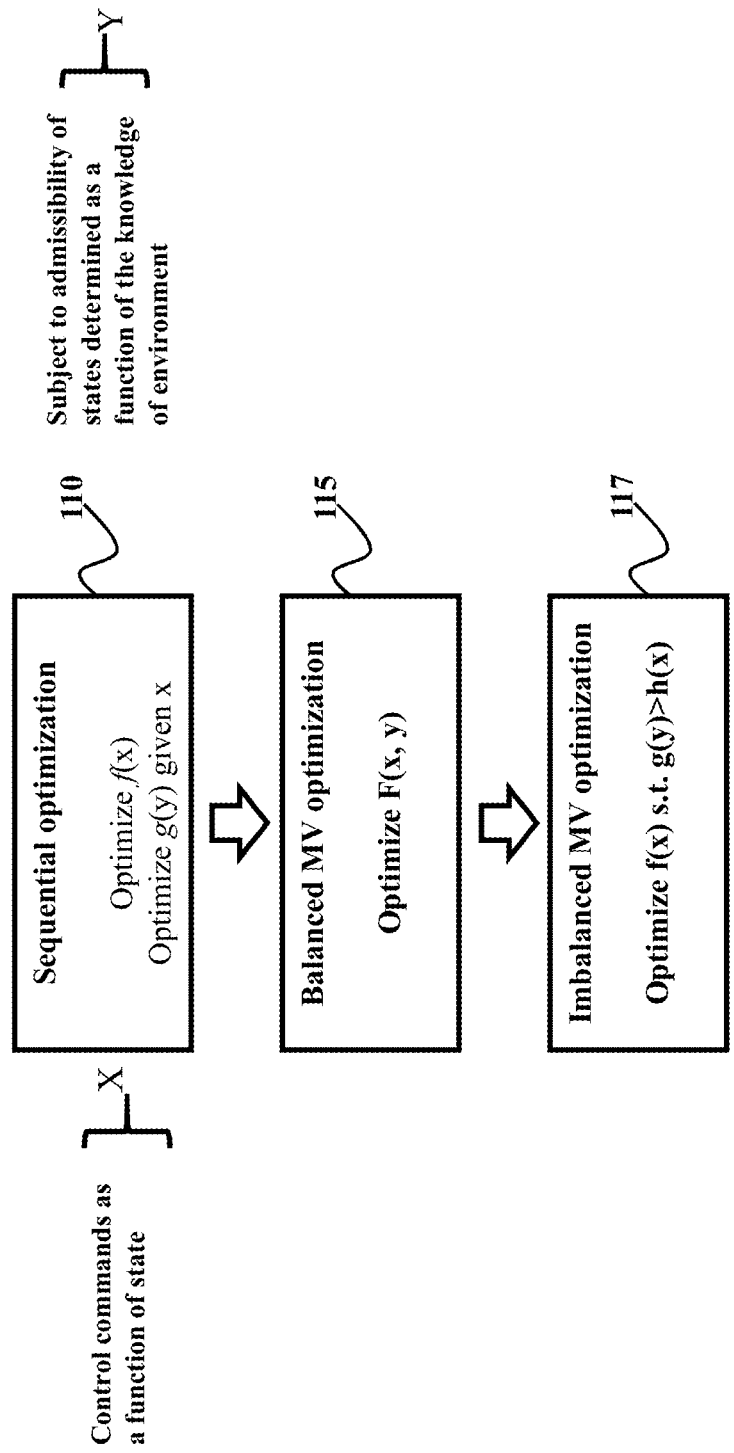
FIG. 1B illustrates a schematic of joint multi-variable optimization, according to an embodiment of the present disclosure.

FIG. 1B illustrates a block diagram of joint but unbalanced multi-variable optimization of the control inputs 105, according to an embodiment of the present disclosure. In FIG. 1B, x represents variables of the ego vehicle 101, and y variables of the environment 103 being subject to admissibility conditions being determined as a function of the knowledge of environment.

To achieve interdependency between x and y, some embodiments disclose determining a state trajectory of the ego vehicle 101 and an amount of knowledge required of a state of the environment 103 surrounding the ego vehicle 101 jointly, i.e., as part of a single unitary multivariable optimization. Hence, some embodiments replace a sequential optimization 110 and a balance multi-variable optimization 115 with imbalance multi-variable optimization 117. The sequential optimization 110 comprises optimizing a function of states f(x) and then optimizing a function of the knowledge of the environment g(y) given x. The balanced multi-variable optimization 115 comprises optimizing a function of both x and y, F (x,y), jointly, in a balanced manner, where a control objective related to state of the ego vehicle 101 is given equal weight as the sensing of the environment 103. However, the imbalanced multi-variable optimization 117 comprises optimizing the function of state, f(x) subject to constraints on the function of the knowledge of the environment g(y)>h(x)

To achieve the unbalance in their importance, some embodiments use multivariable constrained optimization over the state trajectory (which may be defined by f(x)) and the amount of knowledge of the state of the environment (which may be defined by g(y)), in which the knowledge of the environment acts into a constraint. In such a manner, the knowledge of the environment becomes subordinate to the control objective, because the amount of knowledge acting onto the constraint does not have an independent optimization objective, and it is only limiting the control commands chosen for the ego vehicle 101.

Figure 1C:
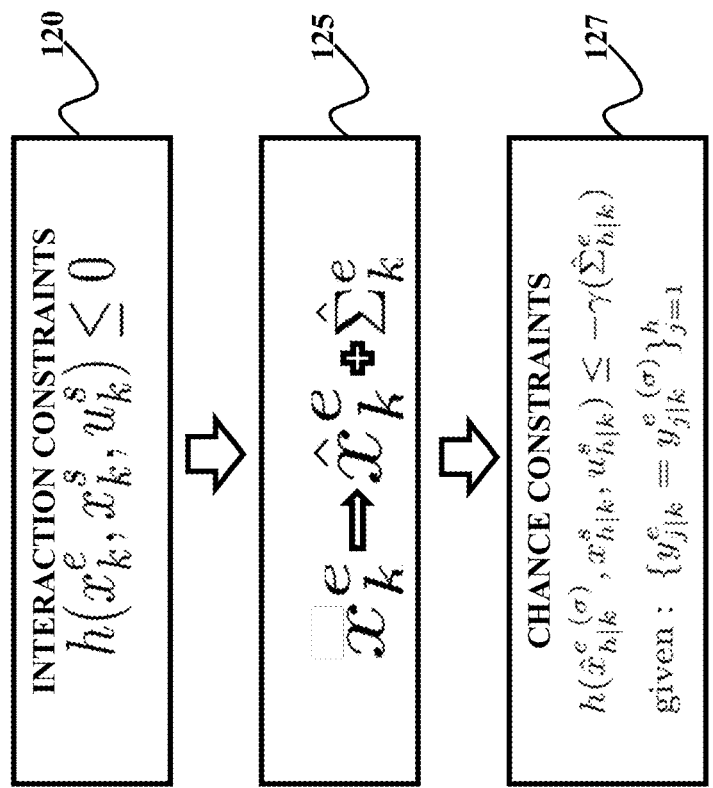
FIG. 1C illustrates a schematic of a constraint used by the imbalance multivariable constrained optimization, according to an embodiment of the present disclosure.

FIG. 1C shows a schematic of a constraint used by the imbalanced multivariable constrained optimization 117 according to some embodiments. It is an object of some embodiments to provide such a multivariable constrained optimization of the control commands and the required knowledge that updates the sensing instruction only when the required knowledge is insufficient to optimize the state trajectory of the ego vehicle 101. To that end, it was realized that additionally or alternatively to imposing the constraint to the acquired knowledge, there is a need to impose constraints on the admissible states of the ego vehicle 101 based on the knowledge that will be acquired. These admissible states govern the space of optimization of the state trajectory of the controlled ego vehicle 101 and thus creates a need to increase the acquired knowledge only if the lack of it prevents reaching the optimal trajectory. In such a manner, some embodiments aim to define the constraints having a structure of an interaction constraint 120 given as $h(x_k^e, x_k^s, u_k^s) \leq 0$.

In some embodiments, the environment 103 is defined by its state referred to herein as a state of the environment or the environment state. The state of the environment collects all relevant data about the environment 103, from the perspective of its impact on the controlled ego vehicle 101. The state of the environment can include multiple state variables such as occupancy grid in an area surrounding the controlled ego vehicle 101, the motion of the points and/or objects in the surrounding environment, the boundary of the space where the controlled ego vehicle 101 can operate, the allowed separation and relative velocities of the ego vehicle 101 with the objects in the environment 103. The state of the environment captures relevant and available or acquired knowledge. The acquired knowledge can be unambiguously transformed into the constraints on the admissible values of the states and the control inputs. However, for the purpose of multivariable constrained optimization, there is also a need to define the constraints based not only on the amount of available knowledge of the environment but also on the lack of this knowledge. It is challenging to define the constraints based on what is unknown.

Some embodiments are based on the realization that the constraints on admissible values of the states and the control inputs can include two parts. The first can be positively defined by the current knowledge of the environment. The second part has a negative nature because it defines the lack of precise knowledge. Some embodiments are based on the realization that the negative nature of the second part can be transformed into a positive limitation based on the first part. That is, instead of having the second part describing the unknowns, the second part can be positively defined as the uncertainty of the first part. In such a manner, instead of having the constraint defined by the known knowledge of the environment and the unknown knowledge about the environment, some embodiments determine the interaction constraint 120 defined by the knowledge of the environment and uncertainty about what has been defined by the knowledge of the environment. Such transformation allows representing unknown knowledge in a manner suitable for constraint derivation.

Hence, in some embodiments, the interaction constraint 120 is defined probabilistically using the state of the environment and the uncertainty of the state of the environment. For example, when the known, i.e., acquired, knowledge is used to define a region of admissible state values or equivalently a region of inadmissible state values of the controlled ego vehicle 101, the uncertainty of the lack of knowledge can be positively represented by shrinking the region of admissible values and/or increasing the region of inadmissible values. In such a manner, the probabilistic interaction constraint 120 can reflect the uncertainty of the knowledge.

However, it is also realized that the prediction of the future state of the environment affect the interaction constraint 120, and that the measurement that will be acquired on the environment 103 in the future affect the prediction of the future state of the environment. Hence some embodiments consider different constraints conditioned to different predictions of future measurements on the environment, resulting in different predictions of the future state of the environment. It is also realized that the uncertainty remains the same across the different measurements, since the uncertainty depends on the quality of the measurements, not on their actual value.

Armed with this understanding, some embodiments disclose combining the interaction constraints 120 and a representation 125 associated with a vector of random variables modeling the uncertain environment $x_k^e$ with mean $\hat{x}_k^e$ and covariance $\widehat{\Sigma_k^e}$ into a probabilistic or chance constraint 127 conditioned to the future measurements of the environment 103. The chance constraint 127 can have various implementations. For example, the chance constraint 127 can be implemented to bind a function of the interaction of the state of the ego vehicle 101, the state of the environment 103, and the control inputs by a negative of a monotonically increasing function of a metric of the uncertainty of the state of the environment when the future measurements of the environment are predicted to take the corresponding values.

To that end, some embodiments disclose that a sequence of control inputs or control commands 105 to the ego vehicle 101 and to the sensors 104 are determined by solving a multivariable and a multistage stochastic constrained optimization problem of a model of the motion of the ego vehicle 101 accounting for the information extraction 111 from the uncertain environment 103. The model of the motion of the ego vehicle 101 relating the trajectory of the state $x^s$ with the sequence of control inputs 105 subject to chance constraints 127 on admissible values of the states of the ego vehicle 101 and the control inputs to the ego vehicle 101 defined based on the desired knowledge of the environment 103 caused by at least some possible transitions of the state of a moving object in the environment 103 at different stages of the stochastic constrained optimization and corresponding uncertainties of the transitioned states of the moving object in the acquired knowledge.

To that end, the motion of the ego vehicle 101 is controlled while satisfying a set of input constraints and the chance constraints on admissible values of states of the ego vehicle 101 and the sensors 104 are controlled by a sequence of sensing instructions, both based on the sequence of the control inputs 105 based on a model of motion of the ego vehicle 101, being determined by solving the multivariable and multistage stochastic constrained optimization problem. Due to the dependence of the environment measurements on the system states and/or inputs of environment measurements, the multivariable and multistage stochastic constrained optimization problem strikes a balance between achieving a tracking objective for the ego vehicle 101 and reducing the uncertainty in the environment 103 through enhanced sensing, which, in turn, can improve future tracking performance of the ego vehicle 101.

In order to achieve such an objective, a cost function that aims at stabilizing both the system state $x^s$ and the environment uncertainty $\Sigma^e$ needs to be provided.

Figure 1D:
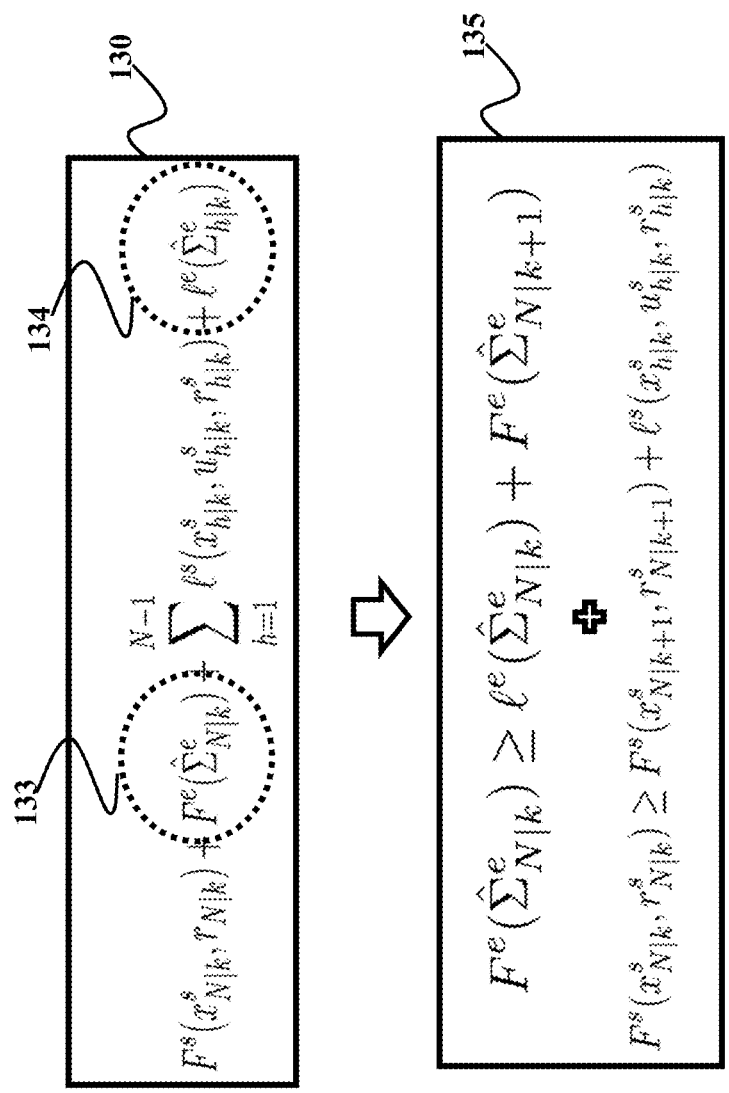
FIG. 1D illustrates a schematic of principles of a cost function optimized by the imbalance multivariable constrained optimization, according to an embodiment of the present disclosure.

FIG. 1D shows a schematic of principles of a cost function optimized by the imbalanced multivariable constrained optimization according to some embodiments. Some embodiments are based on the recognition that the principles of the operation of the ego vehicle 101 can be captured by a cost function 130 including a stage cost 133 $F^e$ ($\widehat{\Sigma_{N|k}^e}$) and a terminal cost 134 $l^e$ ($\widehat{\Sigma_{N|k}^e}$), each including a term proportional to the performance of the state of the ego vehicle 101 relative to the control objective and a term proportional to the amount of knowledge of the environment. Some embodiments are based on a recognition that the inclusion of the term proportional to the amount of knowledge of the environment in the stage cost 133 and the terminal cost 134 in the cost function 130 may help the case where the objective of the control is changed in the future because this could require the ego vehicle 101 to operate in the previously avoided area where information has not been acquired as it was not relevant to the previous control objectives.

However, some embodiments are based on a recognition that to achieve the imbalanced control, the cost function 130 should not be dependent on the state of the environment. To that end, some embodiments either remove the stage and terminal cost from the cost function, e.g., by making their weights equal to zero, or impose a special constraint 135 allowing to improve the acquired knowledge in one or a combination of two scenarios. In the first scenario, the controller 102 does not make any effort to improve the knowledge of the environment unless this brings direct benefits to the performance of achieving the control objective. In the second scenario, the controller 102 may still improve the knowledge of the environment as long as this does not prevent the achieving the control objective.

Thus, in some embodiments the controller 102 is configured to determine a cost function associated with the newly formulated multivariable and multistage stochastic constrained optimization problem that is defined as a function of weighted average of costs obtained by conditioning to sequences of possible predicted future measurements of one or more moving objects in the environment 103 surrounding the ego vehicle 101. The weights for these costs are computed as probability of the sequence of the corresponding sequence of predicted possible future measurements, according to the probabilities of points in a grid of possible future measurements.

Figure 2A:
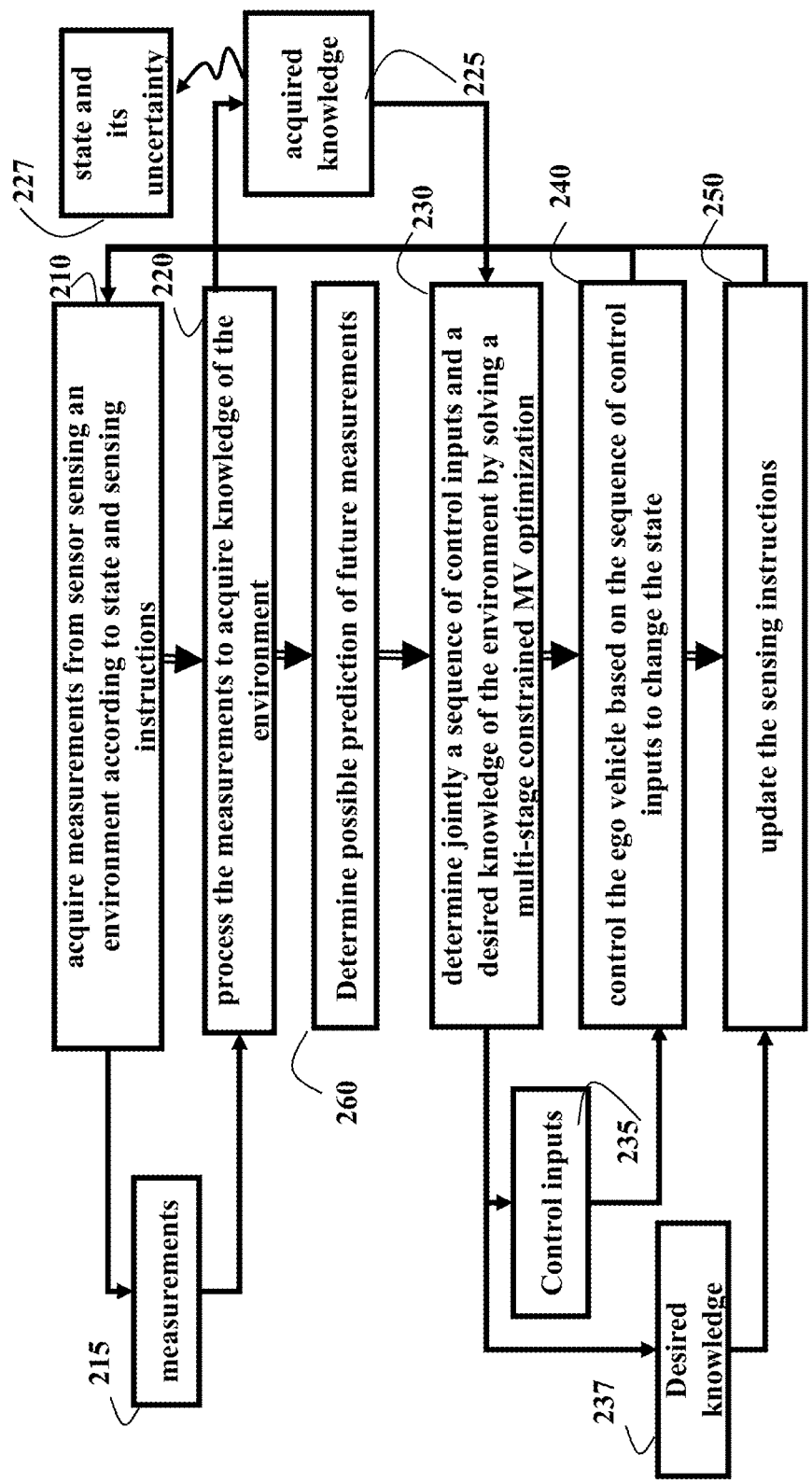
FIG. 2A is a block diagram of a method for multi-stage constrained multivariable optimization performed to achieve joint but imbalance optimization with possible predictions of future measurements, according to an embodiment of the present disclosure.
Figure 2B:
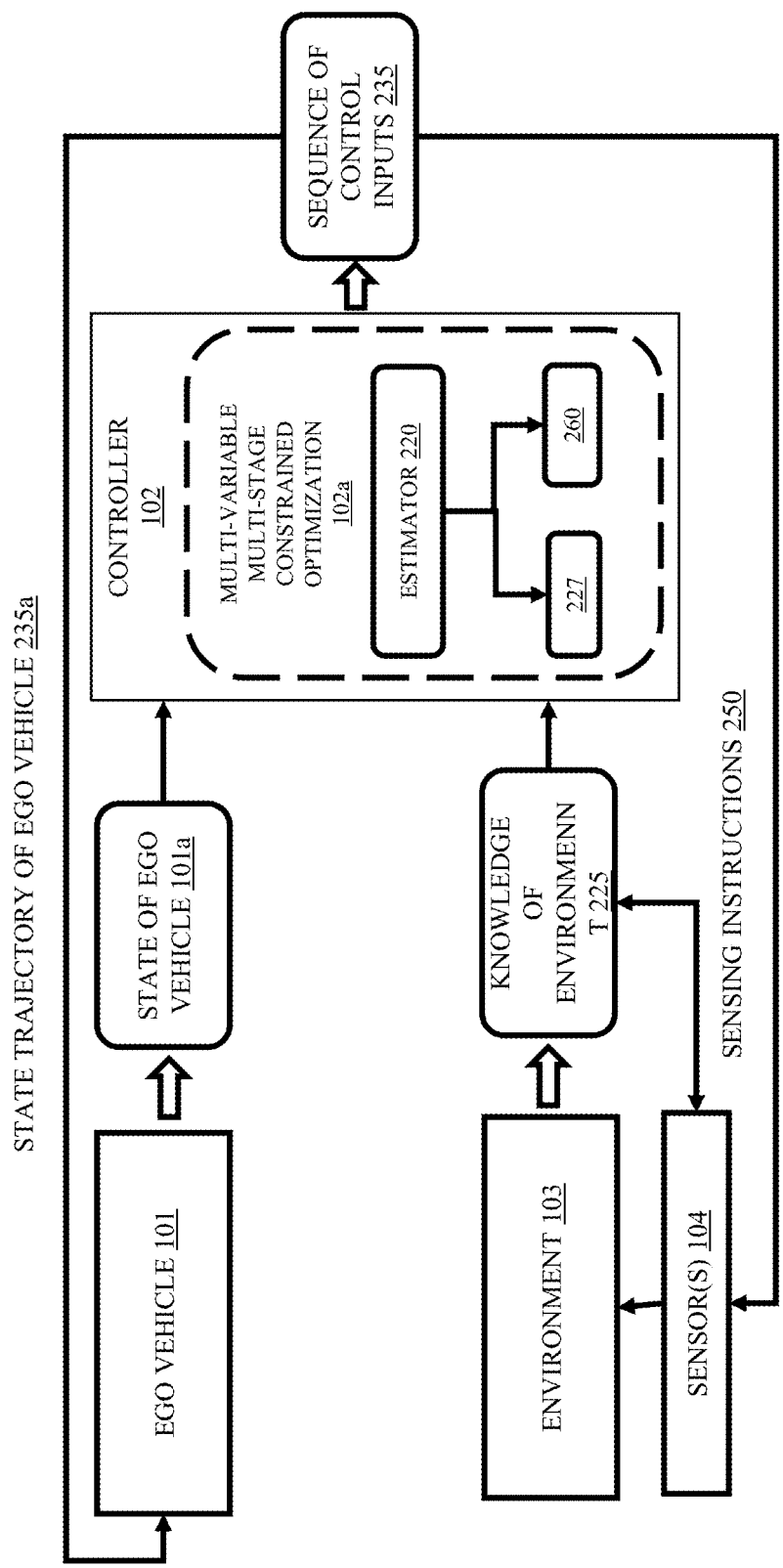
FIG. 2B illustrates a block diagram of the various components implementing the method of FIG. 2A, according to an embodiment of the present disclosure.

FIG. 2A and FIG. 2B show a block diagram of a method for multi-stage multivariable constrained optimization 102a performed by some embodiments of controller 102 to achieve joint but imbalanced optimization.

As shown in FIG. 2A, the controller 102 is configured to acquire 210 measurements 215 from the at least one sensor 104 sensing the environment 103 surrounding the ego vehicle 101 based on a state 101a (shown in FIG. 2B) of the ego vehicle 101 and sensing instructions controlling an operation of the at least one sensor 104 and process 220 the measurements 215 to acquire knowledge 225 of the environment 103 and to estimate 227 a state of the environment and uncertainty of the state of the environment.

Next, the controller is configured to determine possible future measurements 260 of the environment 103 according to the current estimate 227 of the state of the environment and uncertainty of the state of the environment. The possible future measurements 260 are used to construct a multi-stage multivariable constrained optimization problem 102a (shown in FIG. 2B) that is solved to determine 230 jointly a sequence of control inputs 235 to the ego vehicle 101 defining a state trajectory 235a (shown in FIG. 2B) of the ego vehicle 101 and a desired knowledge 237 of the environment. The desired knowledge of the environment 237 may be defined in terms of a sequence of (updated) sensing instructions 250 to the at least one sensor 104. The multi-stage multivariable constrained optimization problem 102a includes a model of dynamics of the ego 101 vehicle relating the state trajectory 235a with the sequence of control inputs 235 subject to a constraint on admissible values of the states and the control inputs defined based on the desired knowledge 237 of the surrounding environment 103 represented by the state of the environment and the uncertainty of the state of the environment 227 and a prediction for the state of the environment based on the possible values of the future measurements 260 acquired on the environment 103. The controller 102 uses the solution of the multivariable constrained optimization problem to control 240 the ego vehicle 101 based on the sequence of control inputs 235 to change the state of the ego vehicle 101, and to update 250 the sensing instructions based on the desired knowledge 237 of the environment 103 and submit the updated sensing instructions to the at least one sensor 104.

Exemplary Structural Components

Figure 3A:
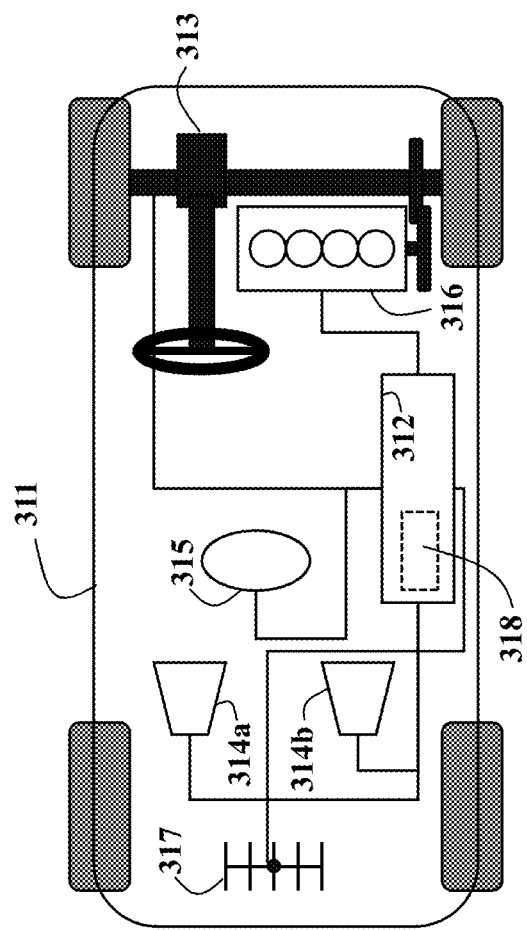
FIG. 3A is illustrates an example use case for a controller for controlling an ego vehicle operating in an environment discovered by sensing, according to an embodiment of the present disclosure.

FIG. 3A is a schematic of an ego vehicle 311 including a controller 312 employing principles of some embodiments of the present disclosure. As used herein, the ego vehicle 311 may be any type of wheeled vehicle, such as a passenger car, bus, or rover. Also, the ego vehicle 311 may be autonomous or semi-autonomous. For example, some embodiments control the motion of the ego vehicle 311. Examples of the motion include the lateral motion of the ego vehicle 311 controlled by a steering autonomous vehicle 313 of the ego vehicle 311. The steering autonomous vehicle 313 is controlled by controller 312.

The ego vehicle 311 may also include an engine 316, which may be controlled by the controller 312 or by other components of the ego vehicle 311. The ego vehicle 311 can also include one or more sensors 315 to sense, by non-limiting example, its current motion quantities and internal status. Examples of the sensors 315 include global positioning autonomous vehicle (GPS), accelerometers, inertial measurement units, gyroscopes, shaft rotational sensors, torque sensors, deflection sensors, pressure sensor, and flow sensors.

The ego vehicle 311 can be equipped with a transceiver 317 enabling communication capabilities of the controller 312 through wireless communication channels via an input interface 318. The vehicle includes one or more sensors 314a, 314b to sense the surrounding environment. Examples of the sensors 314a, 314b may be distance range finders, radars, lidars, and cameras. Alternatively or concurrently, sensor data on the surrounding environment can be received through the transceiver 317 for sensors that are placed remotely with respect to the ego vehicle 311. The ego vehicle 311 may be equipped with a map database of an autonomous vehicle that stores data about the road in the area where the ego vehicle 311 operates, or it can access map data stored remotely through the transceiver 317. As it may be well understood by one of ordinary skill in the art that the ego vehicle 311 may be equivalent to the ego vehicle 101 and the sensors 315, 314a and 314b may be equivalent to the at least one sensor 104 described earlier, without any deviation from the scope of the present disclosure.

In this example, vehicle 311 is the controlled autonomous vehicle 101, the sensors 314a, 314b, and any remote sensors whose information is received from the transceiver 317 are the sensors 104, the controller 312 is the controller 102, the road and the other vehicles are the environment 103 in a non-limiting manner, non-deviant from the scope of the present disclosure.

Figure 3B:
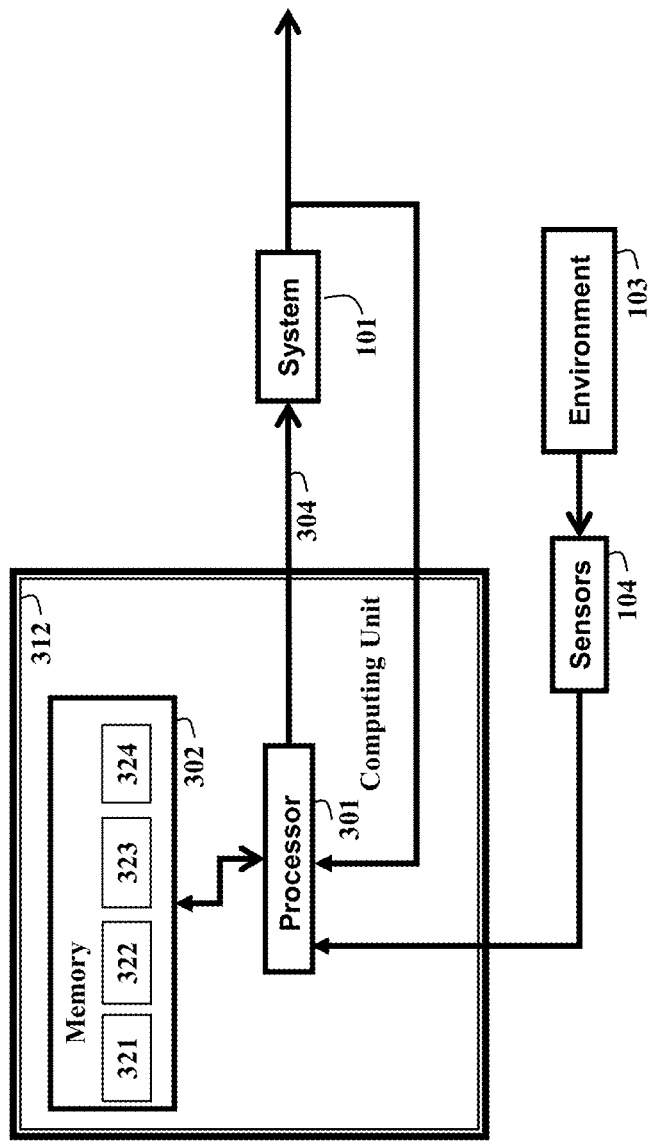
FIG. 3B illustrates a block diagram of a controller and a computing system for controlling an ego vehicle, according to an embodiment of the present disclosure.

FIG. 3B is a block diagram of a computational platform for controller 102 according to some embodiments. For example, FIG. 3B shows a block diagram of controller 312 according to one embodiment. The controller 102 includes a hardware processor 301 connected to a memory 302, e.g., a non-transitory computer-readable medium. In some implementations, the memory 302 includes a first section 321 for storing data about the ego vehicle 101 and a second section 322 for storing a program of the control unit 112 for computing the control of the ego vehicle 101, a third section 323 for storing data about the environment 103 and a fourth section 324 for storing a program for extracting data 111 on the environment from data from the at least one sensor(s) 104.

For example, the first section 321 of the memory 302 can store parameters for the behavior of the ego vehicle 101, such as maximum acceleration and maximal velocity, as well as a model of the ego vehicle 101 and the goal for the ego vehicle 101. The second section 322 of the memory 302 can have embodied thereon a program executable by the processor 301 for computing the command, such as the control command 105, to the ego vehicle 311.

Still referring to FIG. 3B, the third section 323 of the memory 302 includes data about the environment 103, such as the allowed operating space and the presence of other actors, the allowed interactions, the possible behaviors that the other actors may take in the future, and the updated information and the historical amount of information available for the elements in the environment 103. To that end, the environment 103 may include at least one moving object which acts as the other actor in the environment 103 of the ego vehicle 311. The fourth section 324 of the memory 302 can have embodied thereon a program executable by the processor 301 for processing information obtained from the sensors 314a, 314b in the vehicle 311 and remote sensors that communicate through transceiver 317 and for predicting possible measurements according to different conditions.

The processor 301 can be any computational device capable of performing computations and can include one or many physical devices of the same or of different types. It is possible that processor 301 can include multiple computational devices, e.g., microprocessors. Similarly, the memory 302 can be any logical memory and/or non-transitory computer-readable storage medium capable of storing data and can include one or more physical data storage means, of the same or of different types. The computations performed by the processor 301 are commanded by the program stored in the second section 322 and fourth 324 section of the memory and use the ego vehicle data stored in the first section 321 and third section 323 of the memory, the data obtained from the sensors 315, 314a, 314b and transceiver 317. The computation of processor 301 results in commands 304 that change the state of the ego vehicle 101.

Exemplary Operations

Figure 4A:
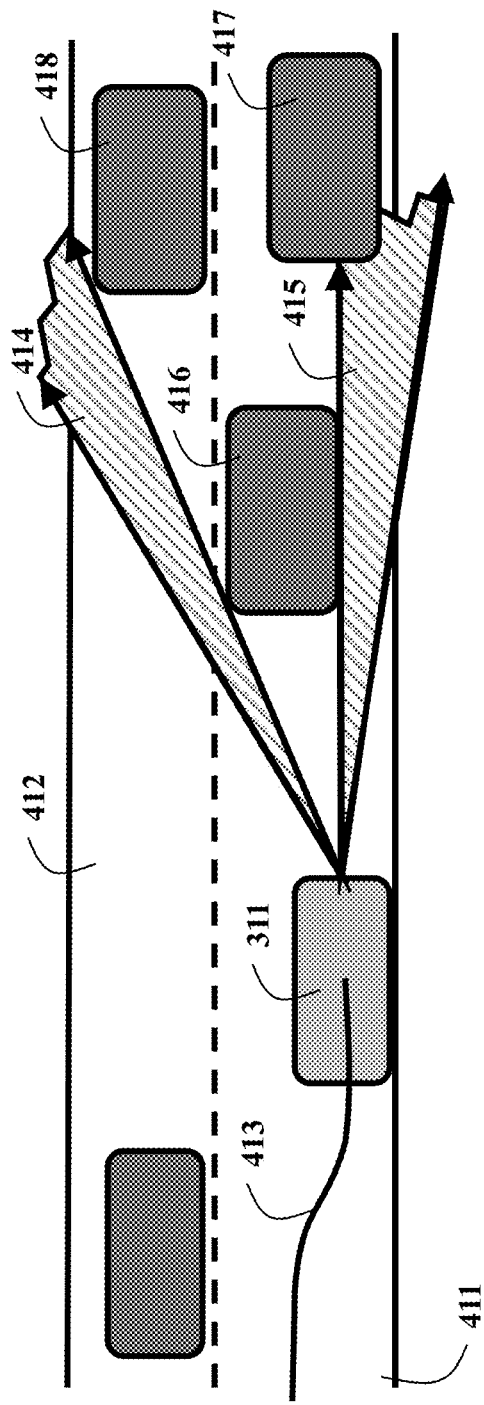
FIG. 4A illustrates an exemplar scenario of operation of the ego vehicle using the controller in a lane change scenario, according to an embodiment of the present disclosure.
Figure 4B:
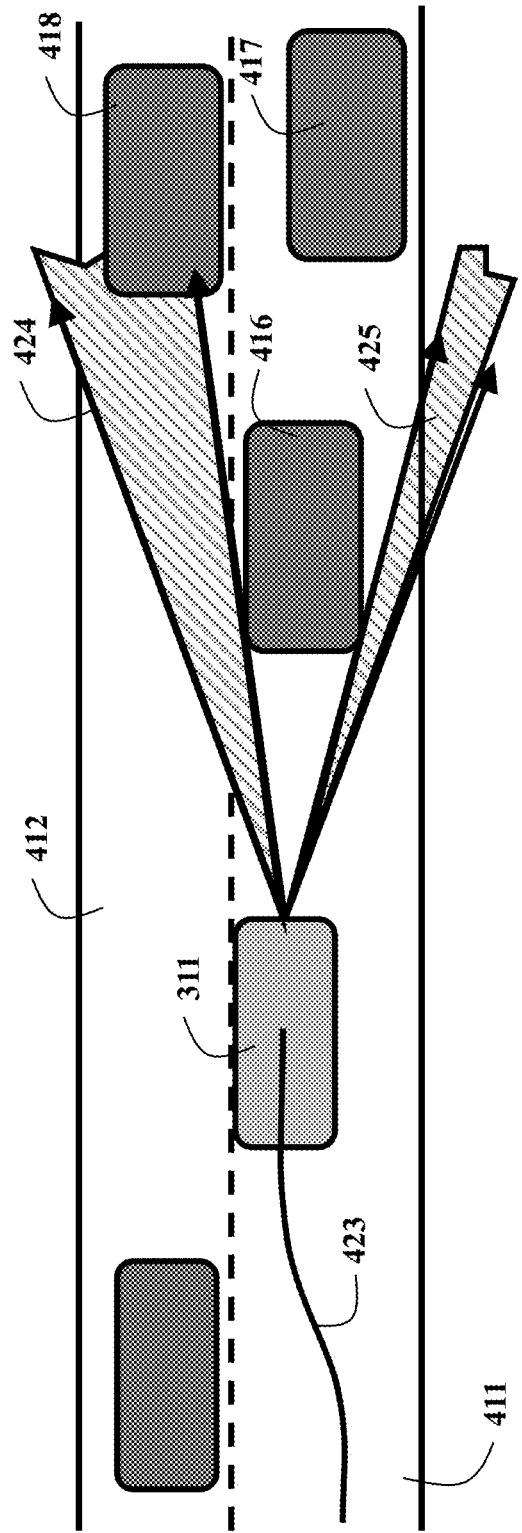
FIG. 4B illustrates a schematic of the results of the operation of the controller according to some embodiments of the disclosure when the controller operates a vehicle to either remain in the current lane or change lane to the left and remaining in the current lane seems preferable if the other vehicle in front does not change lane.

Some embodiments are based on a realization that when the ego vehicle 101 operates in an environment that is not known but discovered through the information acquired through sensing, which itself is related to the commands applied. For instance, FIG. 4A, and FIG. 4B show a scenario when the ego vehicle 311 has to decide whether to stay in a current lane 411 or change to a left lane 412 and there are other actors in the road, specifically, other cars. The other actors include at least one moving object, such as a vehicle 416, a vehicle 417 or a vehicle 418. Each of these other actors may be autonomous, semi-autonomous, or manually driven vehicles, without deviating from the scope of the present disclosure.

If the controller 102 chooses a trajectory 413 as shown in FIG. 4A, due to the vehicle 416 a sensor field of view 414, 415 can capture information on a moving object or vehicle, such as a car further ahead in the current lane 411 but not the vehicle 418 ahead in the left lane 412. If the ego vehicle 311 chooses a trajectory 423 shown in FIG. 4B, due to the presence of the preceding vehicle 416 a sensor field of view 424, 425 cannot capture information on the vehicle 417 further ahead in the current lane 411 but can capture information on the vehicle 418 ahead in the left lane 412. Thus, the trajectory 413 allows acquiring of more information on other vehicle in the current lane 411, while the trajectory 423 allows acquiring more information on vehicle in the left lane 412.

However, the control commands 105 also depend on the available knowledge 225 of the environment 103. Thus, if it is desired to change the lane, lack of knowledge on the vehicle ahead in the left lane 412 may not allow the controller 102 to safely plan a trajectory for the ego vehicle 311 to change to the left lane 412, because of the uncertainty of the position of the vehicles in such lane. Thus, the control commands 105 affect the available knowledge 225 on the environment 103 and the availability of knowledge on the environment 103 affects the control commands 105.

For predicting the future environment for planning the future motion of the ego vehicle 311, the controller 102 needs also to predict the future measurements of the actors in the environment 103, such as the other cars, besides the future uncertainty of the environment based on the sensor and vehicle operation.

Figure 4C:
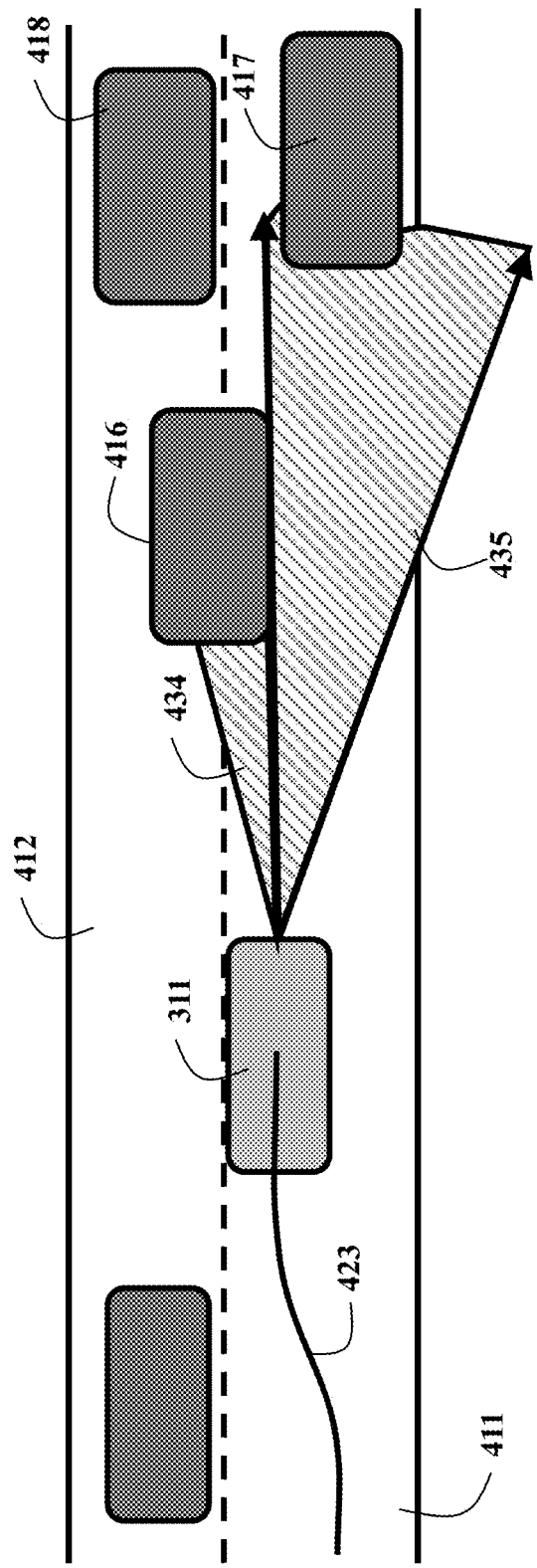
FIG. 4C illustrates a schematic of the results of the operation of the controller according to some embodiments of the disclosure when the controller operates a vehicle to either remain in the current lane or change lane to the left and remaining in the current lane seems preferable but the other vehicle in front changes lane.

As shown in FIG. 4C, if the vehicle 416 changes lane to the left lane, from the lane 411 to the lane 412, a field of view 434, 435 of the ego vehicle 311 changes significantly. This will result in different future measurements (such as future measurements 260 described in FIG. 2A and FIG. 2B) of the environment depending on the behavior of the vehicle 416, that is, of the actor or the moving object in the environment 103. Thus, in some embodiments of the present disclosure, when planning future control actions of the ego vehicle 311 the control actions depend on the predicted future realizations of the measurements. In some embodiments the future realizations of measurements are predicted based on the possible behaviors of the at least one moving object (416, 417, or 418) present in the environment 103, such as if the vehicle 416 stays in the current lane 411 or moves to the next lane 412

Figure 5A:
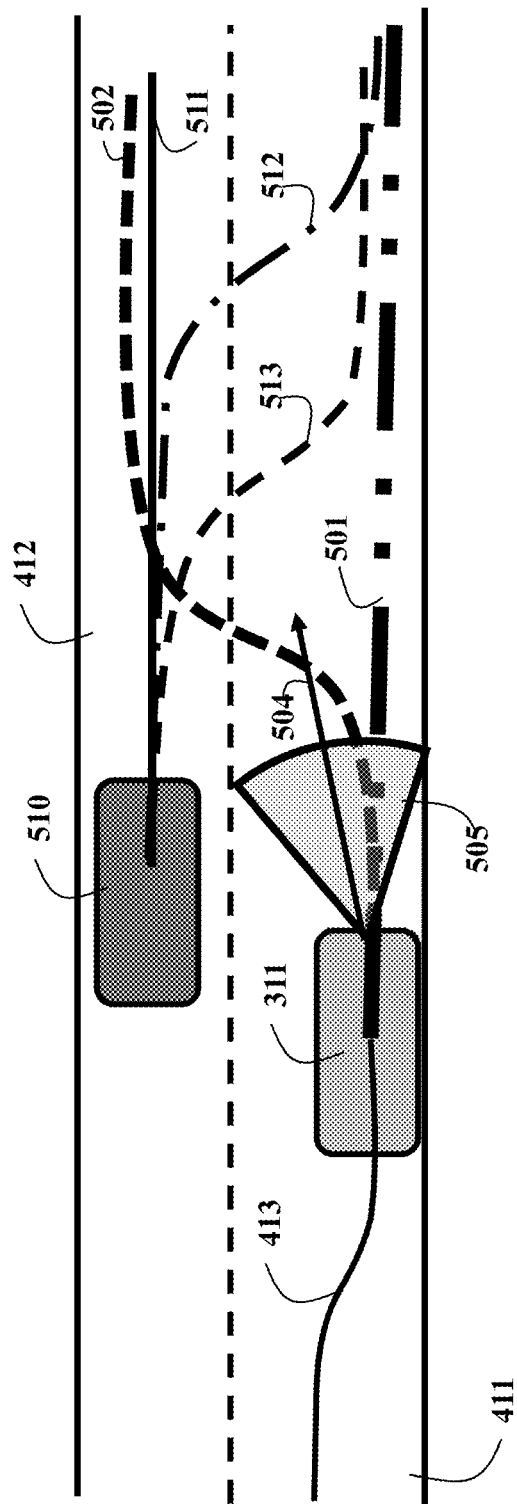
FIG. 5A illustrates a schematic of the possible results of the operation of the controller according to some embodiments of the disclosure when the controller operates the ego vehicle to either remain in the current lane or change lane to the left, and the other vehicle may remain in its current lane or change lane to the right at two different moments.

FIG. 5A shows another scenario on the same road, where the ego vehicle 311 is interacting with another actor or another moving object, such as another car 510 and the ego vehicle 311 can point its sensor 104 to sense in a cone 505 according to a pointing direction 504. The ego vehicle 311 can plan different trajectories, such as a trajectory 501 and a trajectory 502, and also the other car 510 can execute different trajectories, such as a trajectory 511, a trajectory 512, and a trajectory 513, which are a priori unknown to the ego vehicle 311. Depending on the trajectory chosen by the other car 510, different combinations of control actions and sensing may be best for the ego vehicle 311 to plan.

Figure 5B:
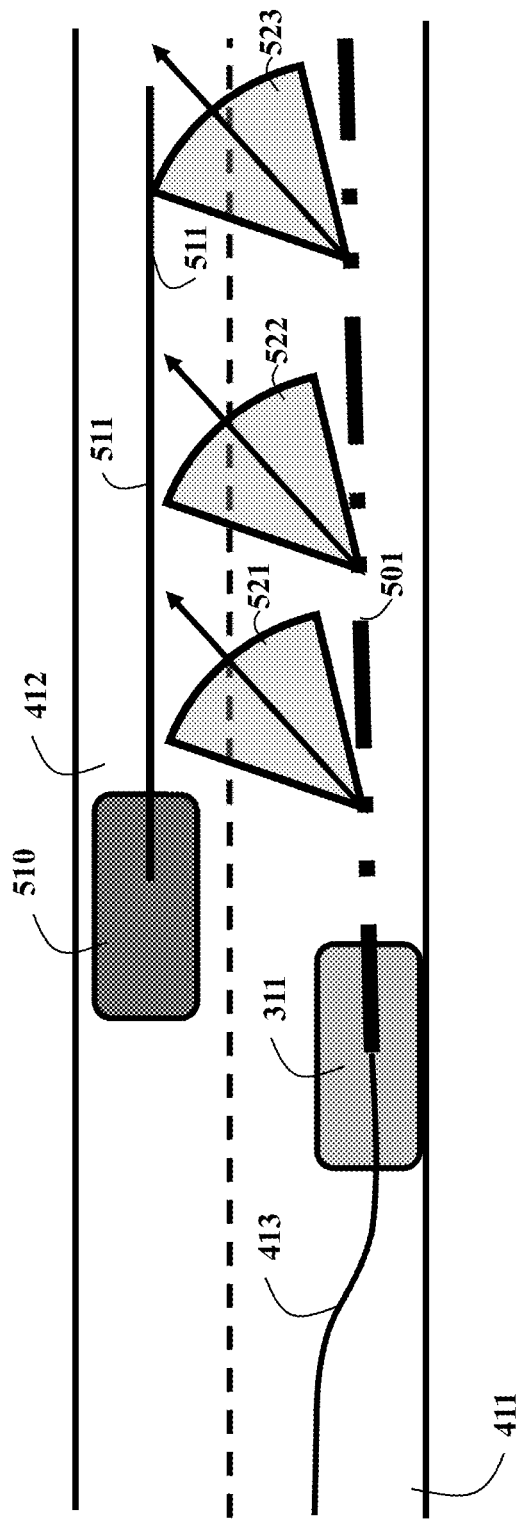
FIG. 5B illustrates a schematic of the result of the operation of the controller according to some embodiments of the disclosure when the controller operates the ego vehicle to remain in the current lane, and the other vehicle remains in its current lane.

For instance, if as shown in FIG. 5B the other car 510 remains in the current lane 412, the best plan for the ego vehicle 311 may be to remain in the same lane 411 and sense in cones 521, 522, 523 at the corresponding points of the trajectory 501 to increase information about the other car 510.

Figure 5C:
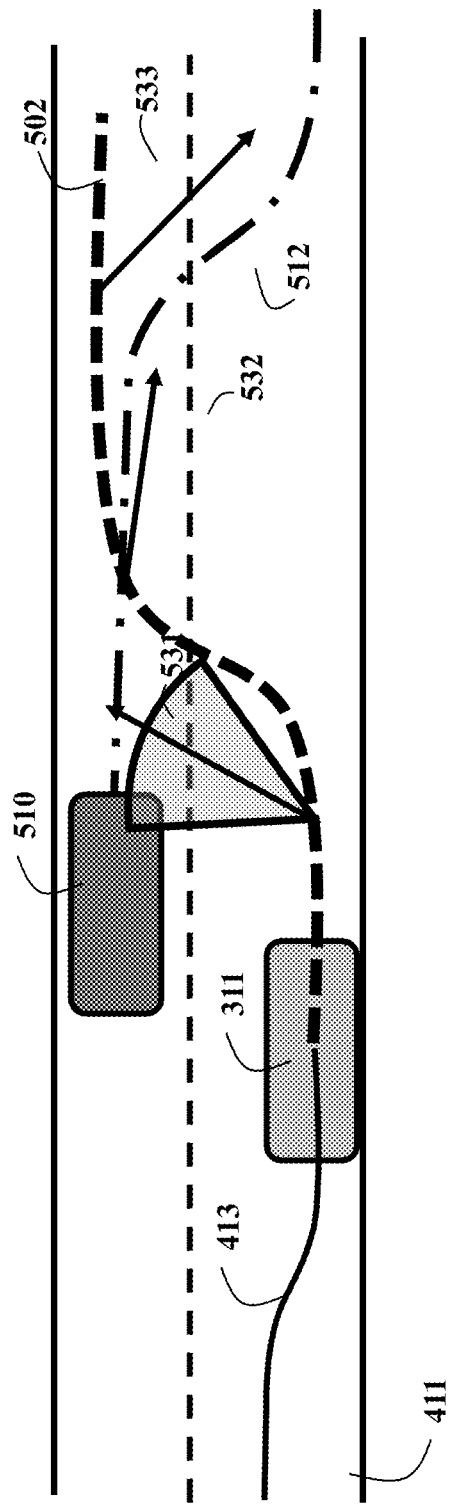
FIG. 5C illustrates a schematic of the results of the operation of the controller according to some embodiments of the disclosure when the controller operates the ego vehicle to change lane to the left, and the other vehicle change lane to the right.

Instead, if as shown in FIG. 5C the other car 510 changes to the right lane 411, the best plan for the ego vehicle 311 may be to change to the left lane 412 and sense in cones 531, 532, 533 at the corresponding points of the trajectory 502 to also increase information about the other car 510, that now moves on a different trajectory. Thus, when planning one must account for the possible different behaviors of actors, like the at least one moving object in the environment 103, such as the car 510 in FIG. 5A, FIG. 5B, and FIG. 5C.

Figure 6A:
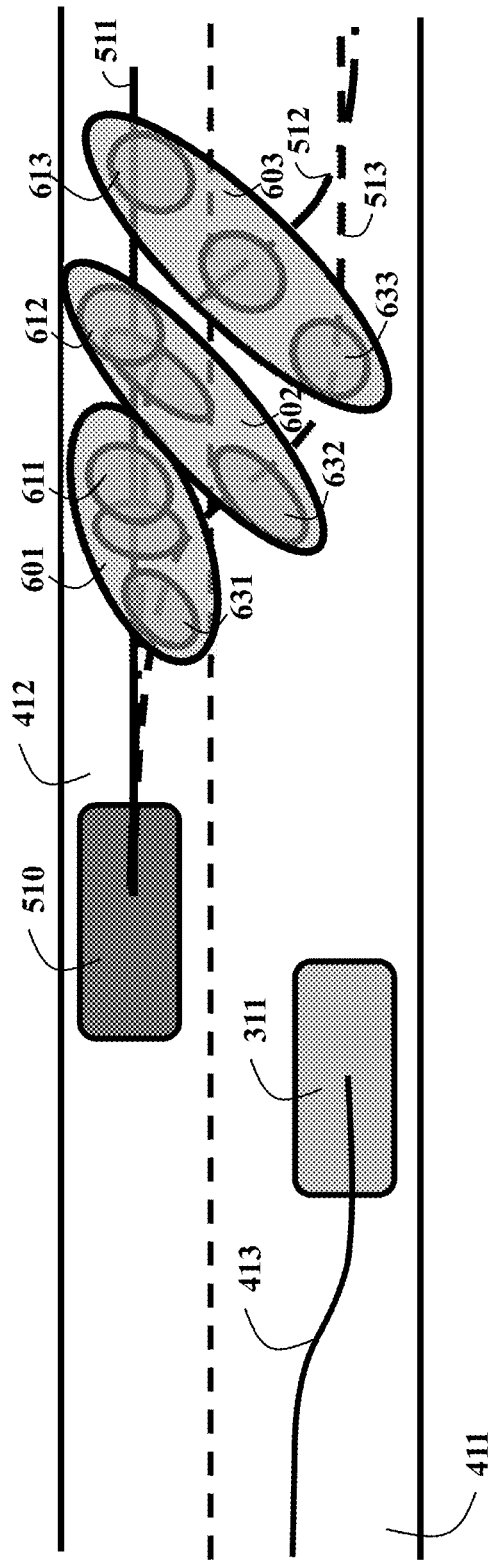
FIG. 6A illustrates a schematic of the uncertainty estimated in the controller when the controller does not condition the decisions to the possible predicted future measurements

FIG. 6A illustrates the impact of uncertainty due to the different behaviors of an actor in the environment 103, the other car 510, specifically, the three trajectories: the trajectory 511, the trajectory 512, and the trajectory 513. Each trajectory has an uncertainty associated to each point due to the perception of the ego vehicle 311 of the other car 510, such as uncertainty ellipsoids 611, 612, and 613 associated to points of the trajectory 511, and uncertainty ellipsoids 631, 632, 633 associated to points of the trajectory 513. Since the three trajectories are all possible, without considering information about the future measurements, the planning for the ego vehicle 311 needs to consider a covering for all the uncertainty ellipsoids of all the trajectories, such as ellipsoids 601, 602, 603. For ensuring safety, the motion plan for ego vehicle 311 must avoid the uncertainty ellipsoids. Thus, the larger ellipsoids may significantly restrict the motion of the ego vehicle 311, which reduces performance. For example, since the uncertainty ellipsoid 613 covers both lanes, it is impossible for autonomous vehicle 311 to pass the other car 510.

Figure 6B:
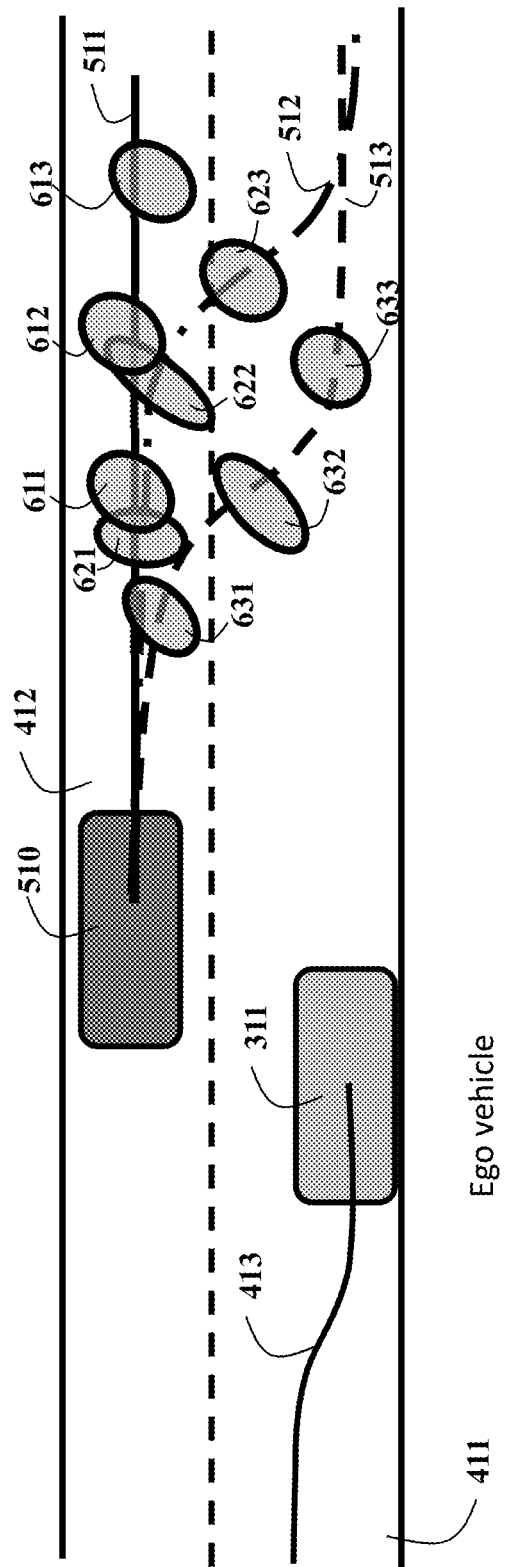
FIG. 6B illustrates a schematic of the uncertainty estimated in the controller according to some embodiments of the disclosure when the controller conditions the decisions to the possible predicted future measurements

FIG. 6B illustrates the impact of uncertainty on the decision of controlling the ego vehicle due to the different behaviors of an actor or one or more other moving vehicles in the environment 103 of the ego vehicle 311. The actor being the other car 510, specifically, with the three trajectories: the trajectory 511, the trajectory 512, and the trajectory 513, according to the present example.

The controller 102 is configured to perform the multivariable and the multistage stochastic constrained optimization by conditioning in probability future transitions of the ego vehicle 311 to the predicted possible future measurements of one or more other moving objects, like the car 510, in the environment 103

By conditioning the decision of control to the future realization of the measurements, which are related to the conditional information on the other car 510's future trajectory, there is no need to cover the uncertainties (such as 611, 612, 613) of the different trajectories (511, 512, 513) of the other car 510 by single uncertainty sets (as 601, 602, 603), because the motion plan of the ego vehicle 311 is already conditioned to the realization of the plan of the other car 510, by conditioning to the realization of the future measurements of the other car 510. Thus, instead of avoiding areas 601, 602, 603, the controller 102 will make different plans that will be selected when the future measurements of the other car 510 realize, that avoid either the uncertainty ellipsoids 611, 612, 613, or the uncertainty ellipsoids 621, 622, 623, or the uncertainty ellipsoids 631, 632, 633. In each case, the area to avoid is much smaller, and therefore the ego vehicle 311 has more drivable area in the road, and hence will be able to achieve higher performance in driving. For example, there is no longer an uncertainty ellipsoid that covers both lanes, so the ego vehicle 311 can always pass the other car 510.

Exemplary Controller Architecture

Figure 7A:
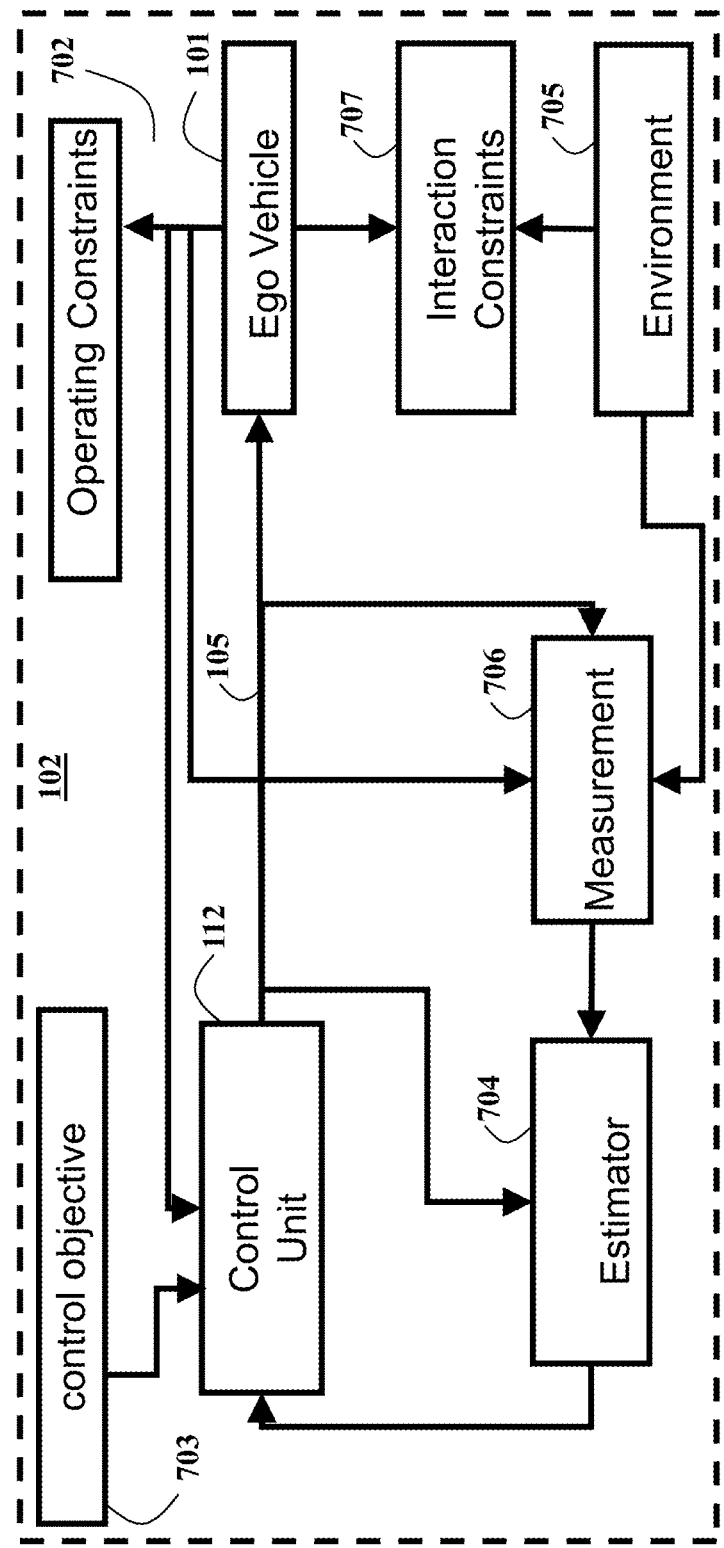
FIG. 7A illustrates a block diagram of a method performed by the controller for controlling a machine operating in the environment that is discovered by sensing, according to an embodiment of the present disclosure.

FIG. 7A illustrates a block diagram of the controller 102 for controlling the ego vehicle 101 according to some embodiments. The controller 102 uses a prediction model or a model of motion of the ego vehicle 101 described by a known function such as a discrete-time update equation, $$x_{k+1}^s = f(x_k^s, u_k^s) \tag{1a}$$

$$y_k^s = g(x_k^s, u_k^s) \tag{1b}$$

where $x^s$ is the state of the ego vehicle 101, which is known, $u^s$ is the command 105 that is issued by the control unit 112, and $y^s$ is the performance output of the ego vehicle 101, i.e., the signal that must achieve a specific goal.

In some embodiments of the present disclosure, the ego vehicle model (1a), (1b) is a kinematic bicycle model given as:

$$\dot{p}^x = v \cos(\psi + \beta(\delta))$$

$$\dot{p}^y = v \sin(\psi + \beta(\delta))$$

$$\dot{v} = a$$

$$\dot{\psi} = (v/l_r)\sin(\beta(\delta)), \quad (1c)$$

where $p^x$, $p^y$ are the East (horizontal) and North (vertical) positions, v is the velocity $\alpha$ is the acceleration, $\Psi$ is the heading angle, $\delta$ is the steering angle and $\beta$ is the vehicle slip angle, given as:

$$\beta(\delta) = \arctan\left(\tan\delta \frac{l_r}{l_r + l_f}\right) \quad (1d)$$

where $l_f$, $l_r$ are the distance of the center of gravity from the front and rear axles, respectively.

Model (1c) is then represented in discrete time with a sampling period $T_s$ as (1a).

The operating requirements on the ego vehicle 101 are described by operating constraints 702 on the ego vehicle state and command $$h^s(x^s, u^s) \leq 0 \quad (2a)$$

For instance, for the kinematic bicycle model (1c) the constraints may be given as:

$$0 \leq v \leq v_{max}, -\psi_{max} \leq \psi - \psi_{rd} \leq \psi_{max},$$

$$\alpha_{min} \leq \alpha \leq \alpha_{max}, -\delta_{max} \leq \delta \leq \delta_{max}, \quad (2b)$$

which include upper and lower limits on velocity, acceleration, heading angle, and steering angle.

The ego vehicle 101 has a control objective 703, such as the output $y^s$ reaching a position or tracking a reference signal $r^s$, $$y_k^s \rightarrow r_k^s \quad (3a)$$

For the ego vehicle 101 modeled as (1c), the output $y^s$ may be:

$$y^s = \begin{bmatrix} p^x \\ p^y \end{bmatrix} \quad (3b)$$

that is the position vector, and the reference signal $r^s$, defines the desired position vector over time. Alternatively, or concurrently, the output vector may include the velocity v and heading $\psi$.

The ego vehicle 101 operates in an environment 103 which is not perfectly known, but information on it can be acquired from sensing to improve the knowledge about it. In some embodiments of the present disclosure, the equations describing the dynamics of the environment 705 are known and modeled by:

$$x_{k+1}^e = f^e(x_k^e, w_k^e) \quad (4a)$$

where $x^e$ is the environment state, which collects all relevant data about the environment, from the perspective of its impact on the ego vehicle 101.

Even though the equations of (4a) may be known, the environment state $x^e$ is not directly known. Furthermore, the model of the environment may be affected by an unknown disturbance $w^e$, which may cause changes in the environment state and is not known to the controller 102. Examples of models for the components in the environment include a constant model with additive disturbance $$p_{k+1} = p_k + w_k \quad 4(b)$$

the constant velocity model $$p_{k+1} = p_k + v_k T_s + w_k \quad 4(c)$$

and the stable tracking first order model $$p_{k+1} = \alpha p_k + (1-\alpha) r_k + w_k \quad 4(d)$$

Different models can be used to represent different components of the environment, resulting in different components of the environment state vector $x^e$.

The information on the environment is obtained from measurements 706 $y^e$ acquired by sensors 104, $$y_k^e = g(x_k^e, v_k^e, x_k^s, u_k^s) \quad (5)$$

where $v^e$ is an unknown noise that corrupts the measurements, and where the measurement depends on the current state of the ego vehicle 101, and possibly also on the current command of the ego vehicle 101.

In some embodiments of the present disclosure, the state of the ego vehicle $x^s$ may affect the quality of the measurement, for instance by reducing the amount of corruption of the measurement caused by the noise. For instance, the measurement can be described by the equation $y_k^e = C^e x_k^e + \|E^e x_k^e - E^e x_k^s\|^2 v_k^e$ where the noise corrupting the measurement increases with the distance of the ego vehicle state from the environment state, such as a road marking that is being detected or an actor on the road, such as another car, that is being tracked.

Some embodiments are based on the realization that the controller 102 may provide sensing instructions to the sensor 104 that change the amount of knowledge acquired by the sensor 104 on the environment 103 or parts of it. For example, the knowledge of a certain area of the environment can be acquired by focusing a radar or lidar sensor on the area of interest without changing the state of the ego vehicle 101. However, the decision on where to focus the sensor 104 does not change the state of the ego vehicle 101. As a result, some embodiments define control inputs that do not affect the change of the state of the ego vehicle 101 but only affect the amount of acquired knowledge on the environment 103 or parts of it and include them in the optimization of the control commands 105.

To that end, in some of the embodiments of the present disclosure, some elements of the ego vehicle command $u^s$ do not directly affect the motion of the ego vehicle but affect the quality of the measurement. For instance, the measurement can be described by the equation $y_k^e = C^e x_k^e + (1-[u_k^s]_d)^2 v_k^e$ where $[u_k^s]_d$ is the $d^{th}$ component of command $u_k^s$, $[u_k^s]_d$ has a range between 0 and 1, and $[u_k^s]_d$ does not affect the autonomous vehicle (1a), (1b). In this case, the noise corrupting the measurement can be decreased by increasing $[u_k^s]_d$. For instance, these may represent the capability of focusing a sensor more on a certain area at a certain time, or to operate additional processing on certain measurements to improve their quality, for instance by correcting for the corruption of the measurement due to noise.

Accordingly, in some implementations, a set of commands defined by the control inputs includes a command related to the sensing instructions having no effects on the state of the ego vehicle 101, while changing the amount of knowledge acquired from the environment 103.

Some embodiments are based on the realization that the constraints on admissible values of the states and the control inputs can be represented as a chance constraint defining in a positive manner the acquired known environment as a state of the environment and the unknown environment as an uncertainty of the state of the environment. For example, the measurements used in an estimator 704 produce an estimate of the state of the environment $\hat{x}_k^e$ and of its uncertainty $\widehat{\Sigma_k^e}$ $$(\hat{x}_{k+1}^e, \hat{\Sigma}_{k+1}^e) = e(\hat{x}_k^e, \hat{\Sigma}_k^e, x_k^s, u_k^s, y_k^s) \quad (6)$$

The uncertainty of the estimator is the inverse of the knowledge of the environment state $\widehat{\Sigma_k^e} = (\kappa_k^e)^{-1}$, that is, the more uncertainty there is on the environment state estimate, the less knowledge there is on the environment state. Similarly, the uncertainty of the estimate is the inverse of the reliability of the estimate $\widehat{\Sigma_k^e} = (\mathcal{R})^{-1}$, that is, the more uncertainty, the less reliable the estimate of the environment state is. The information is the change in knowledge $\mathcal{X}_k^e = (\kappa_{k+1}^e - \kappa_k^e)$ between two consecutive steps.

In some embodiments of this disclosure, it is realized that the estimator 704 can be constructed as a dynamic observer $$\hat{x}_k^e = f^e(\hat{x}_{k-1}^e, \overline{w_{k-1}^e}) - L(x_k^s, u_k^s)(y_k^s - g(\hat{x}_k^e, \overline{v_k^e}, x_k^s, u_k^s)) \quad (7a)$$

$$\widehat{\Sigma_k^e} = \mathcal{F}(\widehat{\Sigma_{k-1}^e}, f^e, L(x_k^s, u_k^s), x_k^s, u_k^s, \Sigma^w, \Sigma^v) \quad (7b)$$

where $L(x_k^s, u_k^s)$ is the observer gain, which may depend on ego vehicle state and command, $\Sigma^w$, $\Sigma^v$ are the uncertainties on disturbance and noise, for instance, their covariances, and $\overline{w}_{k-1}^e$, $\overline{v}_k^e$ are their nominal values, for instance, their means. The function $\mathcal{F}$ depends on the distributions and the environment dynamics, for instance for linear equations of the environment dynamics $$x_{k+1}^e = A^e x_k^e + B^s w_k^e$$

$$y_{k+1}^e = C^e(x_k^s, u_k^s) x_k^e + D^e(x_k^s, u_k^s) v_k^e \quad (7c)$$

and Gaussian disturbance w and noise v with means and covariances, $(\mu^v, \Sigma^v)$, $(\mu^w, \Sigma^w)$, respectively, the estimate update function is $$\hat{x}_{k+1}^e = A^e \hat{x}_k^e + B^e \mu_k^w + L_k((C^e(x_k^s, u_k^s) \hat{x}_k^e + D^e(x_k^s, u_k^s) \mu^v - y_k^e) \quad (7d)$$

and the function updating the uncertainty of the estimate, which here is the covariance or the estimation error, is $$\mathcal{F} = (A^e + C^e(x_k^s, u_k^s) L(x_k^s, u_k^s)) \Sigma_{k-1}^e (A^e + C^e(x_k^s, u_k^s) L(x_k^s, u_k^s))' + (\Sigma_k^w + L(x_k^s, u_k^s) \Sigma_k^v L(x_k^s, u_k^s)') \quad (8)$$

The environment imposes constraints on the ego vehicle represented as the interaction constraints 707

$$h(x_k^e, x_k^s, u_k^s) \leq 0 \quad (9a)$$

which the controller must satisfy in face of the uncertainty. In some embodiments, the function h is referred to as an interaction function.

For ego vehicle example of interaction constraints include staying between the lane boundaries $$b_k^l \leq p_k^y \leq b_k^u \quad (9b)$$

where $b^u$, $b^l$ are the upper and lower bounds of the lane, and collision avoidance with other actors, such as other car 510

$$\begin{bmatrix} p_k^x - o_k^x \\ p_k^y - o_k^y \end{bmatrix}^2 \geq l^v + l^o + l^m \quad (9c)$$

where $l^v$, $l^o$, $l^m$ are the front length of the ego vehicle, the rear length of the obstacle, and the safety margin, respectively.

In such a manner, the uncertainty of a state of the environment 103 is an inverse of the acquired knowledge of the environment 103 and the constraints imposed on the admissible values of the states and the control inputs include an interaction constraint 707 of variables allowed to interact, the variables including the state of the ego vehicle, the state of the environment, and the control inputs, such that the multivariable constrained optimization is subjected to satisfy the interaction constraints in presence of the uncertainty of the state of the environment.

Exemplary Control Unit Operations

In some embodiments, the controller is configured to estimate the environment and the uncertainty of the state of the environment recursively based on a model of dynamics of the state of the environment. For example, the control unit 112 operates iteratively in control cycles, as described in FIG. 7B.

At a control cycle k, the control unit receives 711 the ego vehicle state $x_k^s$. Then, the control unit builds an ego vehicle estimator based on the ego vehicle model (1a), (1b), the ego vehicle operating constraints (2a) and initializes the model at the current ego vehicle state $x_k^s$ $$x_{h+1|k}^s = f^s(x_{h|k}^s, u_{h|k}^s)$$

$$y_k^s = g(x_{h|k}^s, u_{h|k}^s)$$

$$h(x_{h|k}^s, u_{h|k}^s) \leq 0$$

$$x_{0|k}^s = x_k^s \quad (10)$$

The control unit 112 receives 712 from the estimator the current estimate of the state of the environment $\hat{x}_k^e$ and of its uncertainty $\widehat{\Sigma_k^e}$. Then, the control unit builds an estimate for the state of the environment $\hat{x}_k^e$ and of its uncertainty.

In some embodiments, the control unit 112 uses the model of the estimator (6) as the predictor by including an additional uncertainty on the predicted measurements $y_{h|k}^e$ by adding an additional term $\Sigma^y$ in the covariance prediction, which is the covariance of the measurement prediction error, resulting in:

$$\hat{x}_{h+1|k}^e = f^e(\hat{x}_{h|k}^e, \overline{w}_{h|k}^e) - L(x_{h|k}^s, u_{h|k}^s)(y_{h|k}^e - g(\hat{x}_{h|k}^e, \overline{v}_{h|k}^e, x_{h|k}^s, u_{h|k}^s)) \hat{\Sigma}_{h+1|k}^e = \mathcal{F}(\widehat{\Sigma}_{h|k}^e, f^e, L(x_{h|k}^s, u_{h|k}^s), x_{h|k}^s, u_{h|k}^s, \Sigma^w, \Sigma^v, \Sigma^y) \quad (11a)$$

However, this results in an open-loop prediction of the measurement errors, which is known to be conservative. Instead, one can apply a conditional prediction where the prediction is conditioned to the realization of a measurement $$(\hat{x}_{h+1|k}^e)^{(i)} = f^e(\hat{x}_{h|k}^e, \overline{w}_{h|k}^e - L(x_{h|k}^s, u_{h|k}^s)((y_{h|k}^e)^{(i)} - g(\hat{x}_{h|k}^e, \overline{v}_{h|k}^e, x_{h|k}^s, u_{h|k}^s)) \hat{\Sigma}_{h+1|k}^e = \mathcal{F}(\mathcal{F}, f^e, L(x_{h|k}^s, u_{h|k}^s), x_{h|k}^s, u_{h|k}^s, \Sigma^w, \Sigma^v, \Sigma^y) \quad (11b)$$

where $(y_{h|k}^e)^{(i)}$ is the i-th value of the measurement that can realize, and $(x_{h+1|k}^e)^{(i)}$ is the state estimated conditioned to such measurement realizing. As a consequence of the conditioning predictor (11b) does not need the dependence on the measurement prediction error in the covariance prediction, as long as conditioning is done on any possible value of the measurement.

In some embodiments of the present disclosure, it is realized that the predictor (11b) needs to apply conditioning to all possible measurements, which is computationally challenging, meaning that it will require too much computational resources.

Figure 7B:
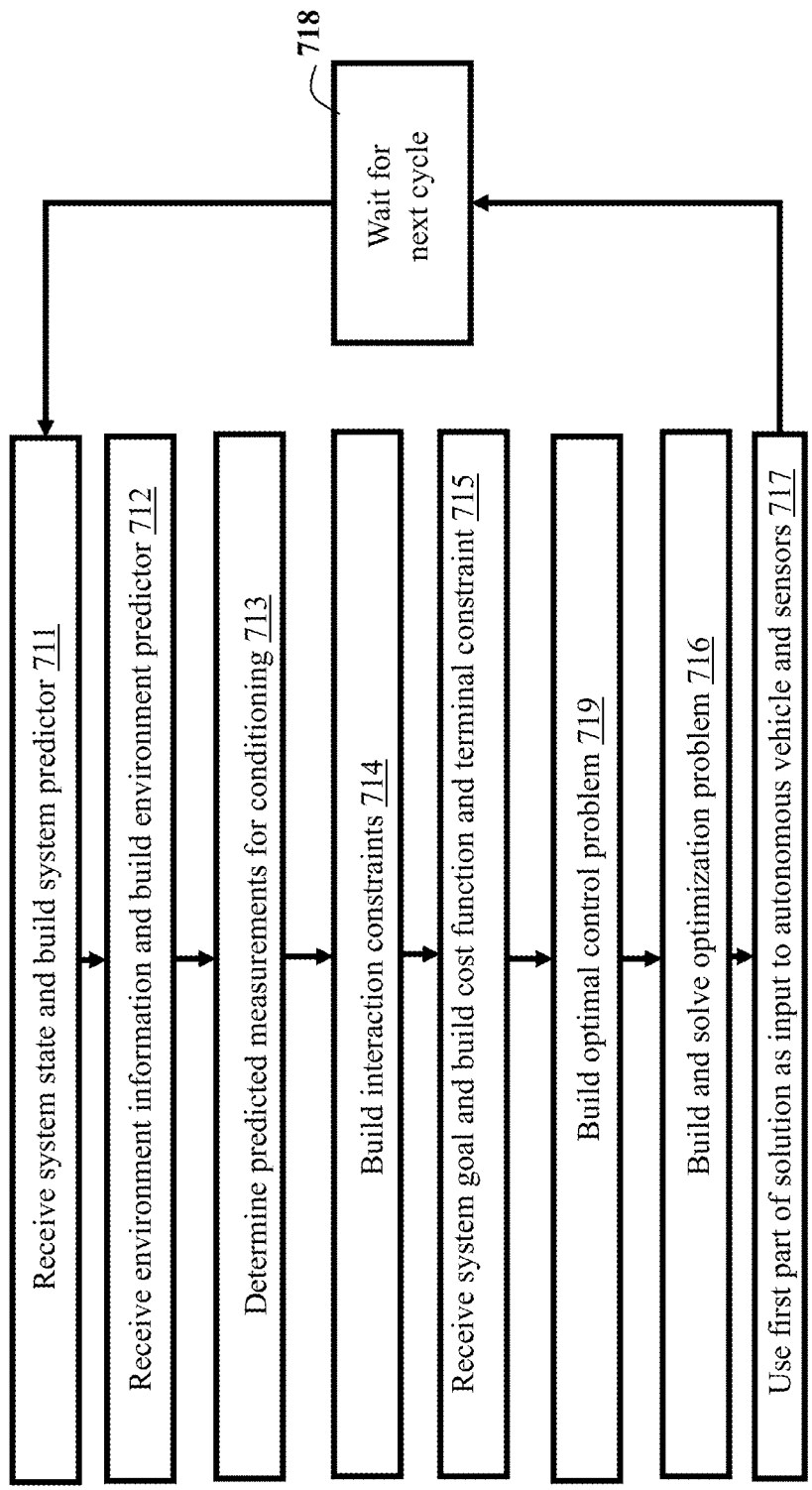
FIG. 7B illustrates a flow diagram of a method of iterative operations performed by the controller, according to an embodiment of the present disclosure.

Instead, as indicated in FIG. 7B, the controller selects a discrete set $\mathcal{Y}^e = \{y_1^e \ldots y_s^e\}$ of predicted measurements for conditioning 713, and applies a conditioning on that discrete set $(y_{h|k}^e)^{(i)} \in \mathcal{Y}^e$ for the estimator $$(\hat{x}_{h+1|k}^e)^{(i)} = f^e(\hat{x}_{h|k}^e,$$
$$\hat{w}_{h|k}^e - L(x_{h|k}^s, u_{h|k}^s))((y_{h|k}^e)^{(i)} - g(\hat{x}_{h|k}^e,$$
$$\hat{v}_{h|k}^e, x_{h|k}^s, u_{h|k}^s))\hat{\Sigma}_{h+1|k}^e = \mathcal{F}(\sum^e_{h|k} f^e, L(x_{h|k}^s,$$
$$u_{h|k}^s), x_{h|k}^s, u_{h|k}^s, \Sigma^w, \Sigma^v, (\Sigma^q)^{(i)}) \quad (11c)$$

where $(\Sigma^q)^{(i)}$ is the covariance of a measurement quantization error.

Figure 8A:
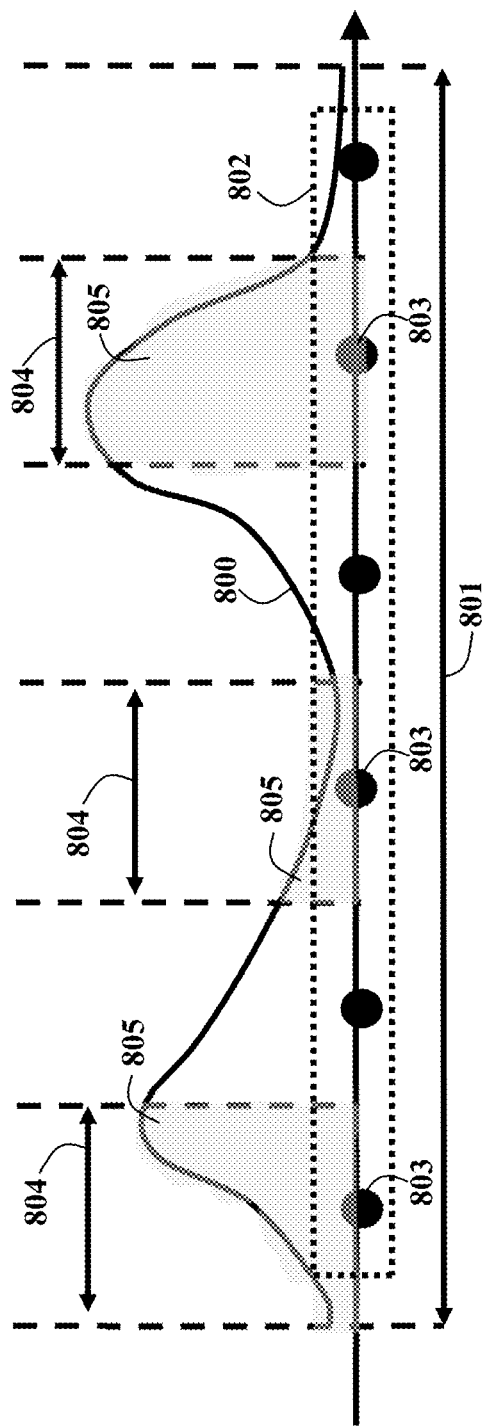
FIG. 8A illustrates a schematic of a grid of possible predicted future measurements that are equidistant and corresponding quantization uncertainty applied by the controller, according to an embodiments of the present disclosure.

As shown in FIG. 8A, for the range of measurements 801 of the predicted future measurements, a grid 802 of possible future measurements is defined. Each point of the grid 802 has associated a range of measurements that it represents, such that the range of measurements associated with the corresponding point provide a probability of the point and a quantization uncertainty of the point. For example, for every measurement possibility such as point 803 in the grid 802 the controller 102 selects the corresponding associated range of measurements 804, that is the range of measurements represented by the measurement possibility 803. Then, to the range of measurements 804, a covariance of the measurement quantization error $(\Sigma^q)^{(i)}$, which represents the quantization uncertainty of the point 803. The measurement quantization error $(\Sigma^q)^{(i)}$ is associated, from the probability distribution of the measurement in the range 804, and also a probability of measurement possibility occurrence $\pi_y^{(i)}$ is associated, which is the area 805 under the measurement probability distribution 800 in the range 804. This represents the probability of the point 803 in the grid 802.

In some embodiments of the present disclosure, the measurement possibilities 803 have a constant spacing in the grid 802 of possible future measurements, so that the ranges 804 have fixed size, respectively, which in general results on a varying area 805 and hence varying measurement quantization error covariance. Thus, a separation of any two neighboring points in the grid 802 is constant, and all ranges of measurements 804 associated with all points 803 in the grid have a same size, the same size being defined by a predetermined numerical value. The predetermined numerical value may be configurable and may be arbitrarily selected based on a desired application of the controller 102.

Figure 8B:
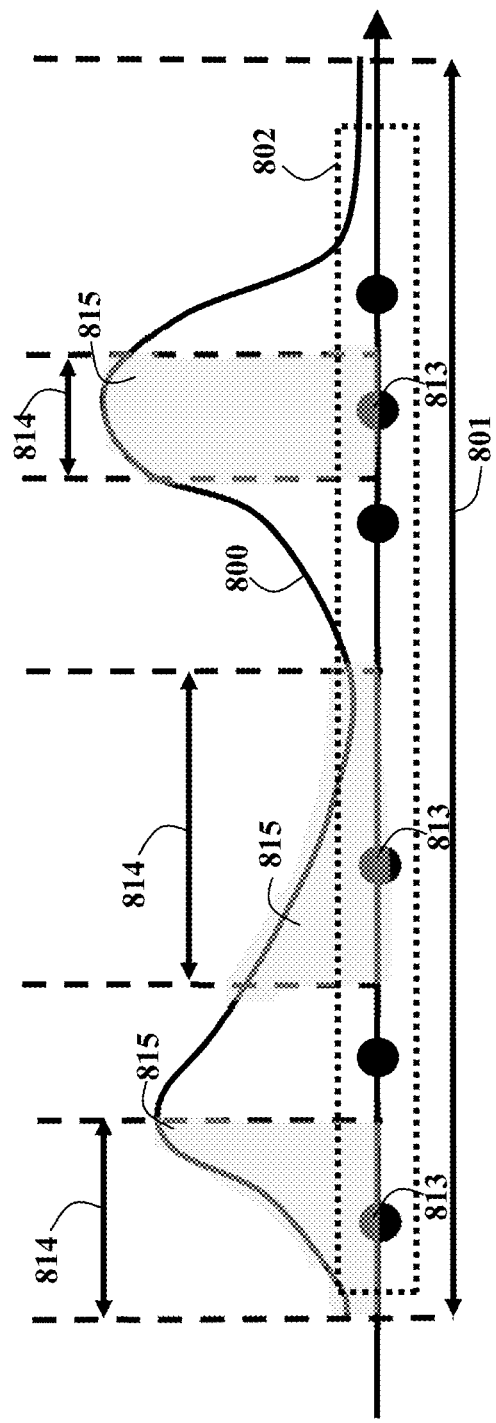
FIG. 8B illustrates a schematic of determination of a grid of possible predicted future measurements and corresponding quantization uncertainty applied by the controller where the possible predicted future measurements have equal probabilities, according to an embodiment of the present disclosure.

In other embodiments of the present disclosure, as shown in FIG. 8B the controller 102 chooses the measurement possibilities 813 to be differently spaced, and the associated measurement ranges 814 to be also of varying size and chosen to keep the areas 815 under the probability curve 800 for the measurement ranges to be constant, which provides a constant probability of measurement possibility occurrence.

In yet other embodiments of the present disclosure, the controller 102 chooses the measurement possibilities, such as for point 813 on the grid 802, to be differently spaced, and the associated measurement ranges 814 to be also of varying size and chosen to keep a constant squared variation from the measurement possibility, which results in constant measurement quantization error covariance $(\Sigma^q)^{(i)} = \Sigma^q$.

Thus, in the grid 802 of points of possible future measurement, the quantization error defined above defines the quantization uncertainty associated with the corresponding point, such as point 813 of the discrete grid 802 of points, which is equal for all the points. Further as already stated above, the quantization uncertainty associated with the corresponding point 813 of the grid 802 is computed as covariance $(\Sigma^q)^{(i)}$ of the range of measurements 814 associated with the corresponding point 813.

Based on the possible future measurements predicted in this manner, the predictor, or the estimator 704 is initialized at the current estimate of the state of the environment $\hat{x}_k^e$ and of its uncertainty $\hat{\Sigma}_k^e$.

$$\hat{x}_{0|k}^e = \hat{x}_k^e, \hat{\Sigma}_{0|k}^e = \hat{\Sigma}_k^e. \quad (11c)$$

Referring back to FIG. 7B, the control unit 112 builds 714 the interaction constraints (9a) from the predicted state of the environment 103 and its uncertainty. Since the environment 103 is not perfectly known, the interaction constraints (9a) are satisfied with assigned confidence despite uncertainty in the estimate of the environment using the estimate of the environment state $\hat{x}_k^e$ and its uncertainty $\hat{\Sigma}_k^e$, representing the deterministic component and the uncertainty component of the knowledge on the environment, respectively, for constructing the constraints.

For example, based on predictors (11a), (11b), one embodiment modifies the constraint (9a) to obtain the uncertainty-dependent tightened interaction constraint that depends on the estimate of the environment and its uncertainty from (6), $$h(\hat{x}_{h|k}^e, x_{h|k}^s, u_{h|k}^s) \leq -\gamma(\hat{\Sigma}_{h|k}^e) \quad (12)$$

where the function $\gamma$ makes the constraint more stringent, to account for the possible error in the predicted environment state estimate $\hat{x}_{h|k}^e$ based on how likely such errors may occur, that is based on the estimated uncertainty. The function $\gamma$ is monotonically increasing with respect to a metric of $\hat{\Sigma}_{h|k}^e$, such as its norm.

If the initial state of the environment 103 is described by a probability distribution $p_{x_{0|k}^e}(x_{0|k}^e)$, and if the disturbance w and the noise v are also described by probability distributions $p_v(v)$, $p_w(w)$, the environment state estimate $x_{h|k}^e$ and of its uncertainty $\hat{E}_{h|k}^e$ are the mean and the covariance of a probability distribution of the environment state estimate $p_{x_{h|k}^e}(x_{h|k}^e)$.

Then, the function $\gamma$ scan be designed so that satisfying (8) guarantees the satisfaction of (7) with a confidence $1-\rho$, $$h(\hat{x}_{h|k}^e, x_{h|k}^s, u_{h|k}^s) \leq -\gamma(\hat{\Sigma}_{h|k}^e) \Rightarrow \mathbb{P}[h(x_{h|k}^e, x_{h|k}^s, u_{h|k}^s) \leq 0]$$
$$\geq 1-\rho \quad (13)$$

For that, the function $\gamma$ can be defined as $$\gamma\left(\hat{\Sigma}_{h|k}^e\right) = \alpha \cdot \sqrt{\frac{\partial h}{\partial x_{e|h}^e}' \hat{\Sigma}_{h|k}^e \frac{\partial h}{\partial x_{h|k}^e}} \quad (14)$$

where $$\frac{\partial h}{\partial x^e}$$

is the sensitivity of the constraint with respect to the environment state and $\alpha$ is a coefficient computed from the probability distribution of $p_{x_{h|k}^e}(x_{h|k}^e)$ and the confidence $1-\rho$. For instance, for $p_{x_{h|k}^e}(x_{h|k}^e)$ Gaussian, $\alpha = F_N^{-1}(1-\rho)$, where $F_N^{-1}$ the standard normal inverse cumulative distribution function, while for a generic distribution $$p_{x_{h|k}^e}(x_{h|k}^e), \alpha = \sqrt{\frac{1-\rho}{\rho}}.$$

In case (9a) contains several constraints, the step is repeated for each constraint separately. For the case of linear constraint, $h'_s x_{h|k}^s + n'_s x_{h|k}^e \leq b_s$ and linear autonomous vehicle dynamics if $p_{x_{0|k}}(x_{0|k}^e)$, $p_v(v)$, $p_w(w)$ are Gaussian, $p_{x_{h|k}}(x_{h|k}^e)$ is Gaussian and hence (12) is $$h'_s \hat{x}_{h|k}^s + \eta'_s \hat{x}_{h|k}^e + F_N^{-1}(1-\rho)\sqrt{\eta'_s \hat{\Sigma}_{h|k}^e \eta_s} \leq b_s. \quad (15)$$

The interaction constraints (12), (15) depends on both the mean $\hat{x}_k^e$ and the covariance $\hat{\Sigma}_k^e$ the estimate of the environment state. However, while the prediction of the covariance are independent of the measurement, the mean depends on predicted measurements $y_{h|k}^e$, through one of the predictors in (11a)-(11 c).

Handling of the nonconvex constraints for collision avoidance, such as the non-convex ellipsoidal constraint $$(x^s - x^e)' P(x^s - x_e) \geq d_{min} \quad (16)$$

is challenging when uncertainty on the environment is present because it is hard to construct a function $\gamma$ in (12) that correctly represents the uncertainty without over-approximating it too much. On the other hand, linearizing the uncertain constraints is also hard, because the linearization irreparably changes the tightening of the constraints due to the uncertainty. In this disclosure it is realized that the effects of the uncertain constraints may be retained by first convexifying the constraints without uncertainty and then imposing the effects of the uncertainty on the linearized constraints.

Figure 9:
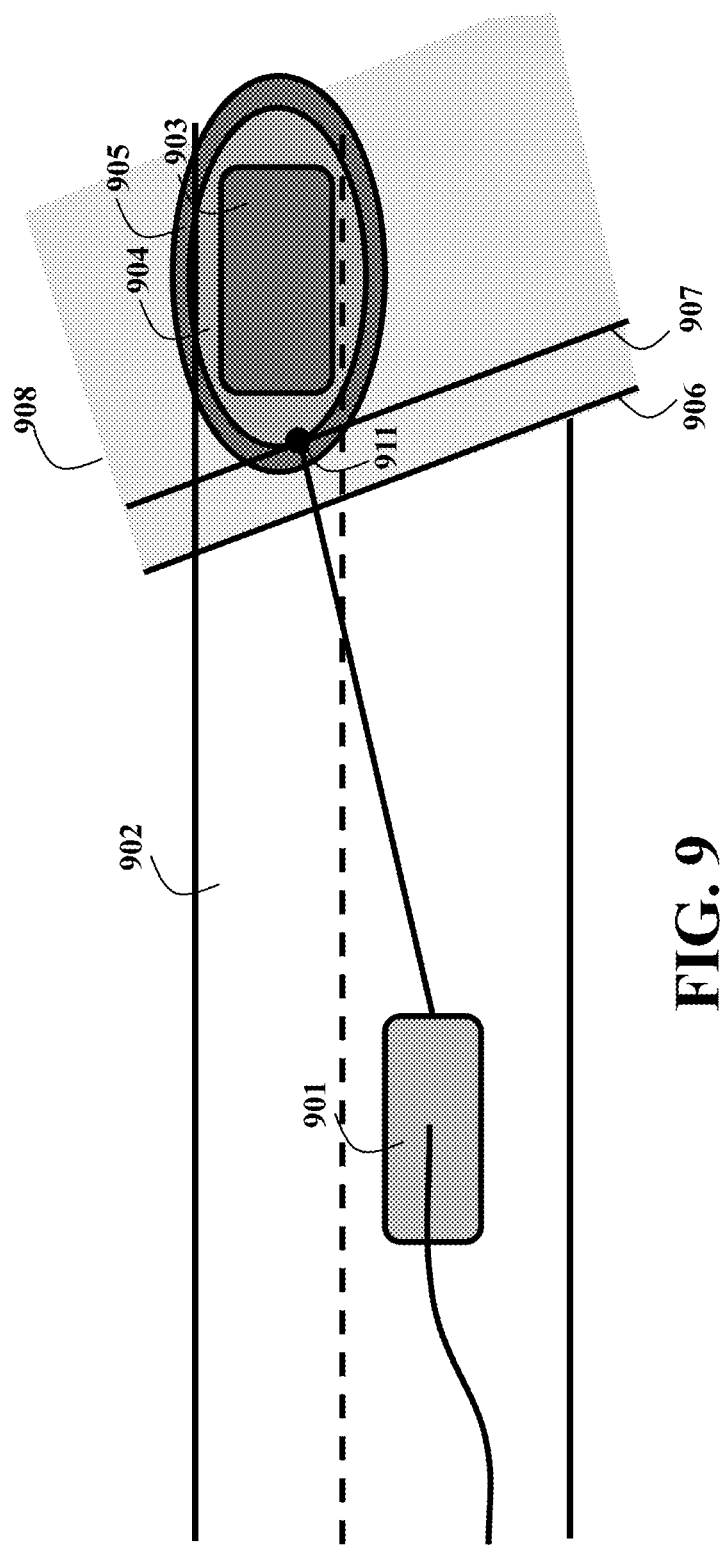
FIG. 9 illustrates a schematic of the convexification of collision avoidance constraints, according to an embodiment of the present disclosure.

FIG. 9 illustrates an ego vehicle 901 operating on a road 902, where another vehicle 903 is present. A collision avoidance region 904 is to be avoided, which is grown into region 905 due to the uncertainty of sensing the state of the other vehicle 903. In some embodiments of the present disclosure, convexification amounts to computing a point 911 on the boundary of the collision avoidance region and using the tangent 907 at such point as boundary of the constraint when there is no uncertainty. When uncertainty is considered, the hyperplane is shifted in a new hyperplane 906, that defines the infeasible region 908 represented by linear constraint. Avoiding such region ensures collision avoidance which now only requires enforcing linear constraints, in the form of (15) which are constructed from (16).

In some embodiments of the present disclosure, point 911 is determined as the closest point of the collision avoidance region 904 to the ego vehicle 901, according to a given distance metric, such as Euclidean distance, norm-based distance, etc.

Exemplar Optimization Techniques

Some embodiments are based on the realization that the controller 102 can optimize the ego vehicle 101 operation and the acquisition of information from the environment 103 based on the sequences of prediction of the measurements acquired from the environment 103 by conditioning the decision to such sequences of measurement predictions, $$(Y_k^e)^{(j)} = \{(y_{0|k}^e)^{(j)} \ldots (y_{N-1|k}^e)^{(j)}\}, j=1, \ldots, N_{sc} \quad (17)$$

For example, as shown in FIG. 7B, the controller 102 receives 715 the current goal of the ego vehicle $r^s$ and builds a predictive cost function associated with the multivariable and multistage stochastic constrained optimization problem of the model of motion of the ego vehicle, conditioned to a sequence of predicted measurements under the assumption that the j-th sequence of future measurements is received $$(J)^{(j)} = \quad (18)$$

$$F\left((\hat{x}_{N|k}^s)^{(j)}, r_{N|k}, \left(\hat{\Sigma}_{N|k}^e\right)^{(j)}\right) + \sum_{h=1}^{N-1} \ell\left((\hat{x}_{h|k}^s)^{(j)}, (u_{h|k}^s)^{(j)}, r_{h|k}^s, \left(\hat{\Sigma}_{h|k}^e\right)^{(j)}\right)$$

where F is the terminal cost of the cost function associated with terminal conditions at the end of the prediction horizon N, and $\ell$ is the stage cost of the cost function, controlled by optimized control inputs taken along the prediction horizon N. For instance, the stage cost may be always greater than or equal to 0 and may have a value 0 when, and sometimes only when, the goal is achieved.

Then, the controller 102 builds the complete cost function under all assumed predicted measurements for conditioning 713 as the weighted average of the cost functions conditioned to a sequence of predicted measurements $$J = \sum_j w_j (J)^{(j)} \quad (19)$$

where $\omega_j$ are nonnegative weights. In some embodiments of the present disclosure the non-negative weights $\omega_j$ are chosen equal to the probability of the sequence $(Y^e)^{(j)}$ computed from the probabilities of the measurement predictions within the sequence, $\pi_y^{(i)}$, such as which were defined in the grid 802 of predicted possible future measurements described in FIG. 8A and FIG. 8B.

The control unit 112, also builds 715 a terminal constraint $$h_N(x_{N|k}^s, r_{N|k}^s, \hat{x}_{N|k}^e, \hat{\Sigma}_{N|k}^e) \leq 0 \quad (23)$$

that is admissible, i.e., if (23) is satisfied, then the operation constraints (2a) and the interaction constraints (9a) are also satisfied, and that is controlled invariant for commands satisfying (17), i.e., if (23) is satisfied, there exists $u_{N-1|k+1}^s$ satisfying (23) such that $h_N(x_{N|k+1}^s, r_{N|k+1}^s, \hat{x}_{N|k+1}^e, \hat{\Sigma}_{N|k+1}^e) \leq 0$ when $r_{N|k+1}^s = r_{N|k}^s$, $\hat{x}_{N|k+1}^e = \hat{x}_{N|k}^e$, $\hat{\Sigma}_{N|k+1}^e = \hat{\Sigma}_{N|k}^e$.

Using the system model (1a), (1b) with constraints (2a), the conditioned predictor of the environment 103, such as (11b) or (11c) which is conditioned on the sequences $(Y_k^e)^{(j)}$, j=1, . . . , $N_{sc}$, the interaction constraints, such as (15) which may also be obtained in full or in part from (16), the cost function (18) that uses (19), the terminal constraint (23) the controller 102 constructs the multivariable and the multistage optimization problem 719 that determines the best decisions for the operations of the ego vehicle 101 and the perception of the environment 103.

However, the optimization problem built at 719 must include also some additional constraints enforcing the fact that at any point in time the controller 102 can take a unique decision based on its past, which are called non-anticipativity constraints. The controller 102 may be caused to impose the non-anticipativity constraints to obtain decisions that are only based on measurements that have realized before the occurrence of the decisions. An additional purpose of enforcing the non-anticipativity constraints is to reduce number of variables in the multivariable and multistage optimization problem 719 by imposing that control decisions that arise from the same sequence of past predictions, have the same value, i.e., are equal, and hence one can be eliminated. Thus, for conditioning sequences of measurement predictions, the $(Y^e)^{(1)}$, $(Y^e)^{(2)}$ that are equal up to step $\bar{h}$, the input must be equal up to step $\bar{h}$ $(y_{h|k}^e)^{(1)}=(y_{h|k}^e)^{(2)}, h=0 \ldots$
$\overline{h} \Rightarrow (u_{h|k}^e)^{(1)}=(u_{h|k}^e)^{(2)}, h=0 \ldots \overline{h}$  (24)

which induces a tree structure in the optimization problem 719.

Figure 10:
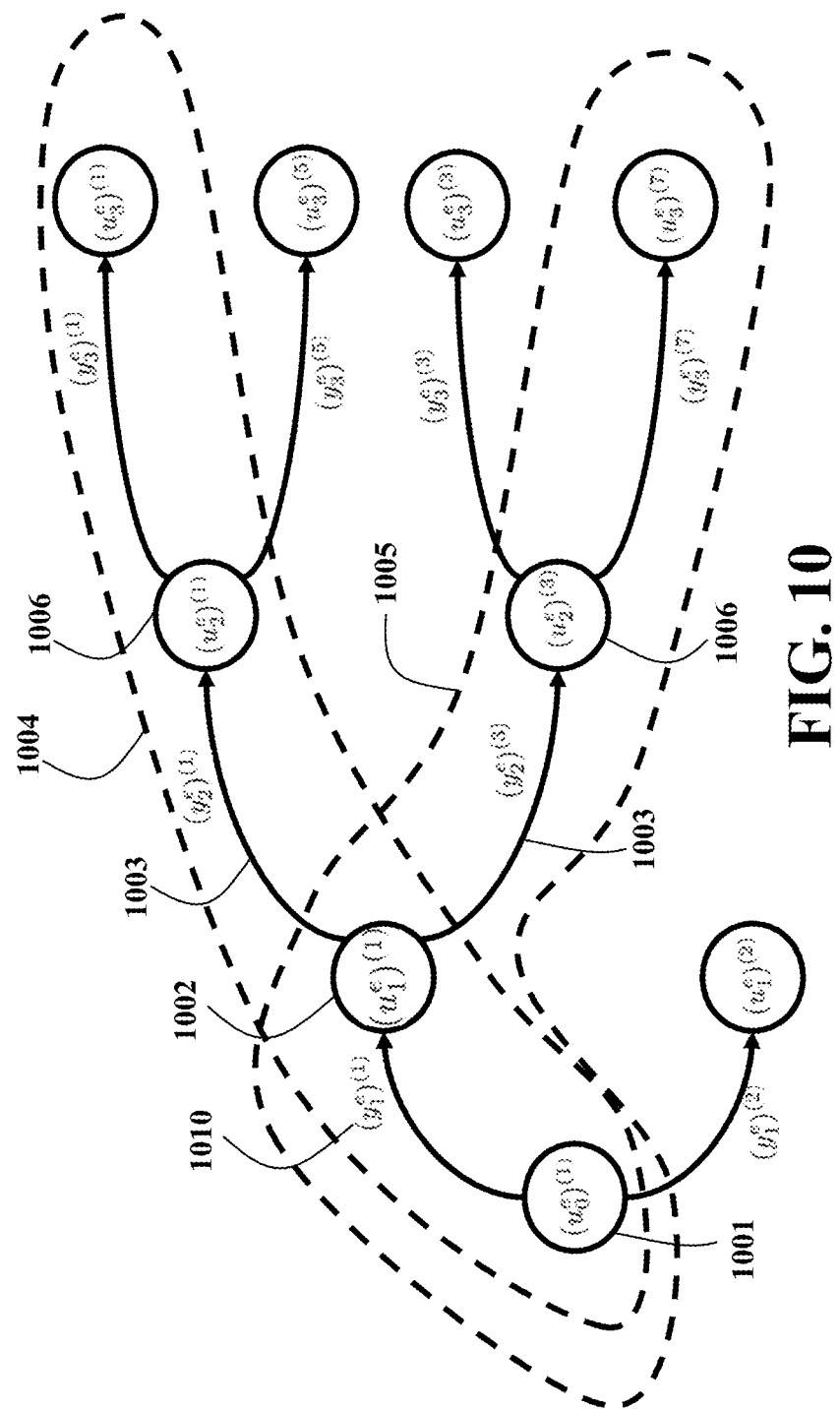
FIG. 10 illustrates a scenario tree including non-anticipativity constraints used by the controller for constructing the optimization problem in presence of conditioning to possible predicted future measurements, according to an embodiment of the present disclosure.

As shown in FIG. 10, the 2 conditioning sequences of measurement predictions 1004, 1005, that share the same predicted measurement 1010 in the first step, also share the same input 1002 at the first prediction step, as well as the same initial input 1001. Instead, since the second future predicted measurement 1003 is different, the input 1006 at the second prediction step is different.

The resulting optimal control problem including the non-anticipativity constraints (24) and the initial condition for the ego vehicle 101 and the estimate of the environment 103 becomes $$\min \sum_j w_j (J)^{(j)} \quad (25)$$

$$\text{s.t. } (x_{h+1|k}^s)^{(j)} = f^s((x_{h|k}^s)^{(j)}, (u_{h|k}^s)^{(j)})$$

$$(y_{h|k}^s)^{(j)} = g((x_{h|k}^s)^{(j)}, (u_{h|k}^s)^{(j)})$$

$$h^s((x_{h|k}^s)^{(j)}, (u_{h|k}^s)^{(j)}) \le 0$$

$$(\hat{x}_{h+1|k}^e)^{(j)} = f^e((\hat{x}_{h|k}^e)^{(j)}, (\overline{w}_{h|k}^e)^{(j)})$$

$$-L((x_{h|k}^s)^{(j)}, (u_{h|k}^s)^{(j)})((y_{h|k}^s)^{(j)} - g((\hat{x}_{h|k}^e)^{(j)}, (\overline{v}_{h|k}^e)^{(j)}), (x_{h|k}^s)^{(j)},$$

$$(u_{h|k}^s)^{(j)}))$$

$$\left(\widehat{\sum}_{h|k}^e\right)^{(j)} = \mathcal{F}\left(\left(\widehat{\sum}_{h|k}^e\right)^{(j)}, f^e, L((x_{h|k}^s)^{(j)}, (u_{h|k}^s)^{(j)}), (x_{h|k}^s)^{(j)},$$

$$(u_{h|k}^s)^{(j)}), \sum^w, \sum^v, \left(\sum_{h|k}^q\right)^{(j)}\right)$$

$$h_s'(x_{h|k}^s)^{(j)} + \eta_s'(\hat{x}_{h|k}^e)^{(j)} + F_N^{-1}(1-\rho)\sqrt{\eta_s'\left(\widehat{\sum}_{h|k}^e\right)^{(j)}\eta_s} \le b_s$$

$$h_N\left((x_{N|k}^s)^{(j)}, r_{N|k}^s, (\hat{x}_{N|k}^e)^{(j)}, \left(\widehat{\sum}_{N|k}^e\right)^{(j)}\right) \le 0$$

$$(y_{h|k}^e)^{(1)} = (y_{h|k}^e)^{(2)}, h=0 \ldots \overline{h} \Rightarrow (u_{h|k}^e)^{(1)} = (u_{h|k}^e)^{(2)}, h=0 \ldots \overline{h}$$

$$(\hat{x}_{0|k}^s)^{(j)} = \hat{x}_k^s, (\hat{x}_{0|k}^e)^{(j)} = \hat{x}_k^e, \left(\widehat{\sum}_{0|k}^e\right)^{(j)} = \widehat{\sum}_k^e$$

is converted 716 into an optimization that jointly determines the state trajectory of the ego vehicle 101 and the amount of information to be acquired on the state of environment 103 surrounding the ego vehicle 101 according to the prediction of the measurements based on conditioning, which implements the tree-structure shown in FIG. 10.

The optimal solution of the problem contains the sequence of optimal commands $\{(u_{h|k}^s)^{(j)*}\}_{h=0}^{N-1} \{u_{h|k}^{s*}\}_{h=0}^{N-1}$ for the ego vehicle 101 and possibly the sensors 104 along the future horizon of length N cycles for all the conditioning sequences of measurement predictions, $(Y_k^e)^{(j)}$, $j=1, \ldots, N_{sc}$. The first part of such command sequence is used 717 as a command for the ego vehicle 101 and possibly the sensors 104 at the current control cycle, since $(u_{0|k}^s)^{(j)*} = u_{0|k}^{s*}, \forall j=0, \ldots, N_{sc}$ $u_k = u_{0|k}^{s*}$.  (26)

Then, the control unit waits 718 until the next cycle. Thus, the estimator (6) updates the estimate of the environment state and its uncertainty using $u_k = u_{0|k}^{s*}$, and the ego vehicle 101 state changes due to the command $u_k = u_{0|k}^{s*}$ as described by (1a), (1b).

Since the number of variables in the optimal control problem increases exponentially with the prediction horizon N it is further recognized in this disclosure that the complexity of the optimization problem constructed from (25) can be reduced by imposing that the conditioning sequences of measurement predictions are extended with only one value after a branching horizon $N_B$.

FIG. 11A illustrates branching horizon, $N_B$ 1113 upto which branching of the tree structure is extended for conditioning of measurements. The branching horizon $N_B$ 1113 is selected to be lesser than the prediction horizon N 1114. Thus, it is identified that $(y_{h|k}^e)^{(j)} = (y_{h+1|k}^e)^{(j)}$, $\forall h=N_B \ldots \overline{N}-1$, $\forall j-1 \ldots N_{sc}$.

Figure 11B:
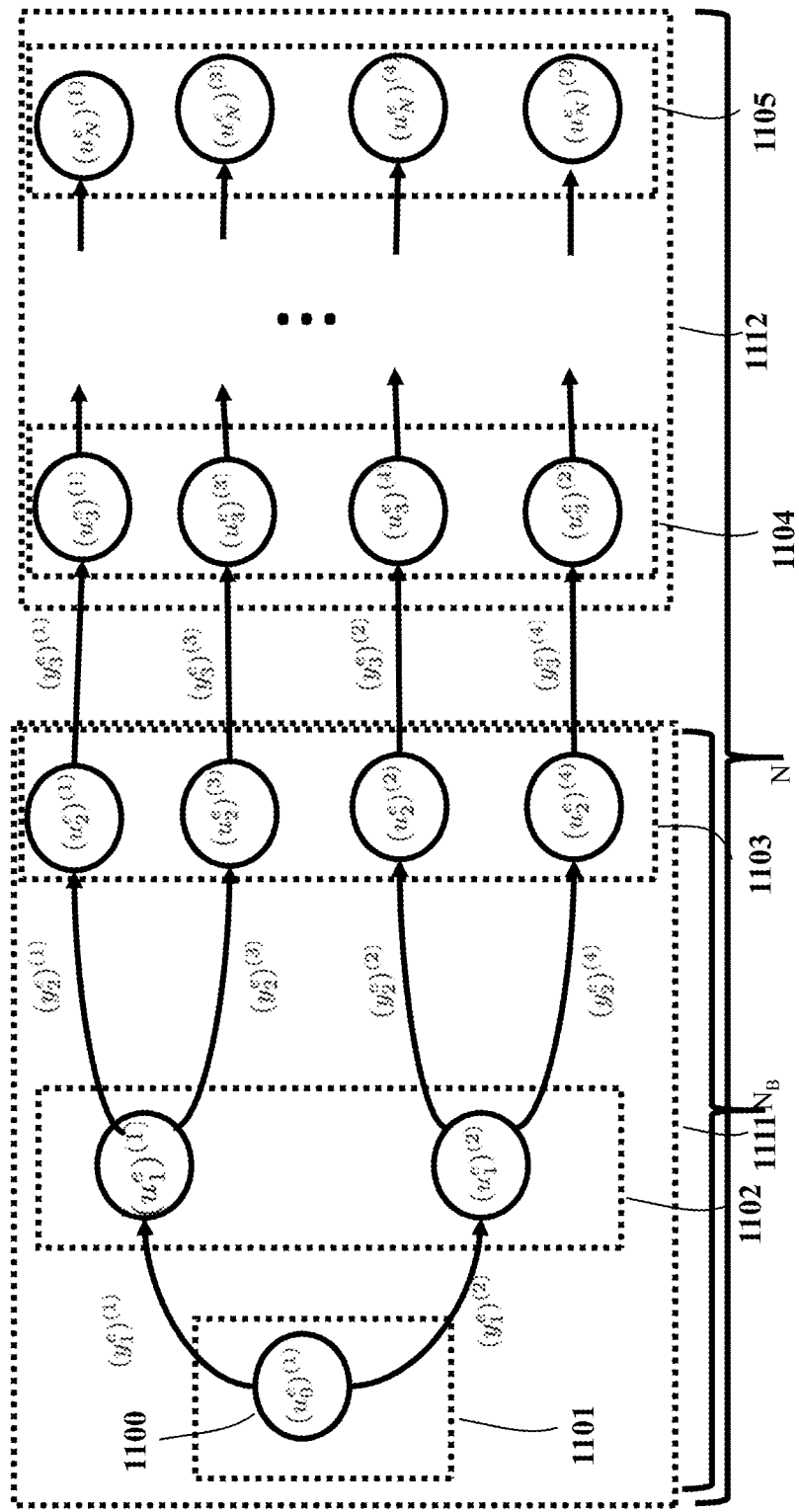

As shown in FIG. 11B, this results in a first part 1111 or of the optimal control problem where the number of optimization variables in each stage 1101, 1102, 1103 increases, due to considering multiple possibilities for the predicted future measurements, and a second part 1112 of the optimal control problem where the number of optimization variables in each stage 1104, 1105 remains the same, due to considering only one possibility for the predicted measurement. The branching horizon $N_B$ is the number of stages in the first part 1111, of the optimal control problem, excluding the root node 1100. Thus, by making $N_B$ smaller, the controller reduces the computational burden for solving (25).

In some embodiments of the present disclosure, the controller 102 obtains the measurement predictions used in the conditioning sequences of measurement predictions by evaluating the possible operation of the other actors, such as one or more other moving objects. The other moving objects may be such as a vehicle and a pedestrian on the road according to a discrete set of targets of such other actors.

Figure 12:
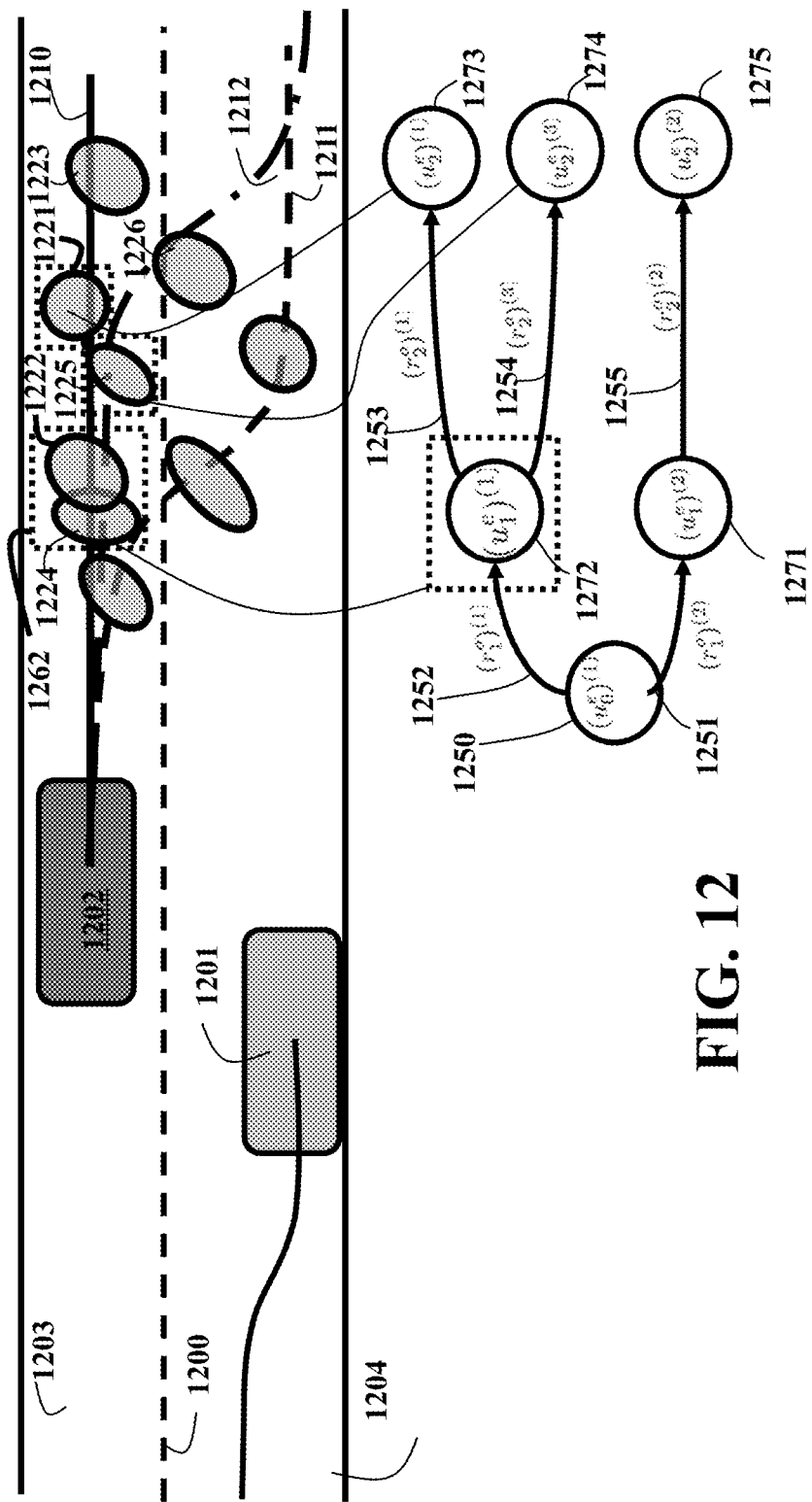
FIG. 12 illustrates the relation between the possible behaviors of the future behavior of the other vehicles and the scenario tree used by the controller to build the optimization problem when possible predicted future measurements for conditioning are obtained from possible future behaviors of the other vehicles, according to an embodiment of the present disclosure.

As shown in FIG. 12, the ego vehicle 1201 is operating in a road 1200 where one or more other moving objects, such as another vehicle 1202 is also present. The other vehicle 1202 may remain on the same lane 1203 or change to the next lane 1204. Thus, the controller 102 can predict a state trajectory 1210 for the other 1202 that stays in the current lane, or a state trajectory 1211 that changes lane at current instant, or a state trajectory 1212 that changes lane at a future instant. Conditioning to the goal of the other vehicle 1202 results in conditioning of predicted measurements on the other vehicles, where the predicted measurements are predicted along the state trajectory that the other vehicle 1202 will take according to its goal. In fact, the controller 102 associates uncertainties, such as the confidence ellipsoids 1221-1226, to each point of the state trajectories, such as 1211, 1212, 1213, due to the trajectory quantization. Thus, the controller 102 is configured to obtain a structure for the multi-variable and multi-stage optimization problem (25) as in FIG. 10, but where now the non-deterministic predicted variables are the targets of the other vehicle 1202.

Further, as illustrated FIG. 12, from the node 1250 associated to the current vehicle position, the controller 102 is configured to predict the target 1251 of changing lane at the next step, which results in node 1271 and being forced to continue the lane change by the sole target of changing lane 1255, it continues to node 1275, so that the controller predicts the other vehicle trajectory 1211. From the node 1250 associated to the current vehicle position, the target 1252 of maintaining current lane at the first step results in node 1272, which can indicate either the state trajectory 1210, where the other vehicle 1202 stays in the current lane, or the state trajectory 1212 where the other vehicle changes lane at a later step, since the two points of uncertainty 1222 and 1224 together 1262 are assigned to node 1272 in the decision problem. However, from node 1272 if the controller 102 predicts the target of other vehicle 1202 to remain to stay 1253 in the current lane 1203, the node 1273 is reached and the controller 102 predicts trajectory 1210, while if the controller 102 predicts the target of other vehicle 1202 to change lane at this current step, now the second, 1254, the node 1274 is reached and the controller predicts the state trajectory 1212.

For instance, the controller 102 may be configured to use a linear model for the motion of the other actors, such as the other vehicle 1202, $$x^o(k+1)=A^o x^o(k)+B^o r^o(k)$$

$$y^o(k)=C^o x^o(k)+D^o r^o(k) \qquad (27)$$

which is embedded into the environment model (4a) where the targets of other vehicles are associated to values of $r^o$. Once the values for $r^o$ are predicted, based on the estimate of the environment 103 which provides an estimate of the state of other vehicle $x^o$, the measurements of other vehicles are predicted as $y^o$ obtained by computing (27). These values are embedded into predicted values of $y^e$, that are the predicted measurements of the environment 103 used to build the conditioning sequences of predicted environment measurements to be used by the controller 102 for computing the actions of the ego vehicle 101 and sensors 104, by solving (25). In some embodiments the controller is configured to enforce constraints that include constraints on the operation of the ego vehicle 101 and probabilistic constraints relating the ego vehicle 101 and the environment 103, wherein at least one of the constraints is a collision avoidance constraint avoiding collision with one of the moving obstacles, like the other vehicle 1202, wherein the moving obstacle is represented by a convex shape. The controller is further caused to convexify the collision avoidance constraint by a linear stochastic constraint separating the obstacle from a current vehicle position. The linear stochastic constraint is constructed by determining a first point on the border of the convex shape of the obstacle. The by determining a tangent plane to the obstacle shape at the first point and constructing a linear constraint that imposes the ego vehicle 101 to remain on the same side of the constraint along the prediction horizon. Further, the controller is configured to add the uncertainty to the estimate of the obstacle state as uncertainty to the linear constraint.

The controller 102 may also be used in applications including objects other than moving vehicles, such as in industrial applications involving robots that are configured to lift or transport objects according to set goals and trajectories and may be operating in uncertain environments including humans or other such obstacles.

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable autonomous vehicle language code or intermediate code that is executed on a framework or virtual autonomous vehicle. Typically, the functionality of the program modules may be combined or distributed as desired in various embodiments.

Also, the embodiments may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A controller for controlling an ego vehicle in an environment surrounding the ego vehicle and including at least one moving object, the controller comprising:
   at least one processor; and memory having instructions stored thereon that, when executed by the at least one processor, cause the controller to:
   acquire knowledge of the environment from measurements of at least one sensor of the ego vehicle sensing the environment based on at least one of: a state of the ego vehicle, and sensing instructions associated with controlling an operation of the sensor;
   process the acquired knowledge of the environment to estimate a state of the environment, the state of the environment including a state of the at least one moving object and uncertainty of the state of the environment including uncertainty of the state of the at least one moving object;
   determine jointly, a sequence of control inputs for controlling the ego vehicle, the sequence of control inputs defining a state trajectory of the ego vehicle; and a sequence of sensing instructions to the at least one sensor defining a desired knowledge of the environment, wherein the sequence of control inputs being determined by solving a multivariable and a multistage stochastic constrained optimization of a model of the motion of the ego vehicle, the model of the motion relating the state trajectory with the sequence of control inputs subject to chance constraints on admissible values of the states of the ego vehicle and the control inputs to the ego vehicle defined based on the desired knowledge of the environment caused by at least some possible transitions of the state of the moving object at different stages of the stochastic constrained optimization and corresponding uncertainties of the transitioned states of the moving object in the acquired knowledge; and
   control the ego vehicle and the sensor based on the sequence of control inputs and the sequence of sensing instructions.

2. The controller of claim 1, further caused to:
   predict possible future measurements of one or more other moving objects in the environment; and determine possible future transitions of the states of the at least one moving object using the predicted possible future measurements of the one or more other moving objects.

3. The controller of claim 2, wherein the multivariable and the multistage stochastic constrained optimization is obtained by conditioning the future transitions of the ego vehicle to the predicted possible future measurements of one or more other moving objects in the environment.

4. The controller of claim 2, wherein the predicted future measurements are selected from a grid of possible future measurements, wherein each point of the grid has associated a range of measurements that it represents, such that the range of measurements associated with the corresponding point provide a probability of the point and a quantization uncertainty of the point.

5. The controller of claim 4, wherein the grid of possible future measurements is determined such that a separation of any two neighboring points in the grid is constant, and all ranges of measurements associated with all points in the grid have a same size, the same size being defined by a predetermined numerical value.

6. The controller of claim 4, wherein the grid of possible future measurements is determined such that the probability of a measurement to be on a corresponding range of measurements associated with a point of the grid is equal for all the points.

7. The controller of claim 4, wherein the grid of possible future measurements is determined such that the quantization uncertainty associated with a corresponding point of the grid due to considering a discrete grid of points is equal for all the points.

8. The controller of claim 7, wherein the quantization uncertainty associated with the corresponding point of the grid is computed as covariance of the range of measurements associated with the corresponding point.

9. The controller of claim 2, further caused to predict possible future measurements by predicting possible future behaviors of the one or more moving objects in the environment.

10. The controller of claim 1, wherein the multivariable and multistage stochastic constrained optimization is associated with a cost function, the cost function being defined as a function of weighted average of costs obtained by conditioning to sequences of possible predicted future measurements.

11. The controller of claim 10, wherein the weights are computed as probability of the sequence of the corresponding sequence of predicted possible future measurements, according to the probabilities of the points in the grid of possible future measurements.

12. The controller of claim 2, wherein the multivariable and multistage optimization comprises branching of each stage based on conditioning applied to possible predicted measurements of the one or more other moving objects at a time corresponding to the stage.

13. The controller of claim 12, wherein a branching horizon on which the conditioning to possible future measurements is operated is shorter than a problem horizon.

14. The controller of claim 13, wherein a length of the branching horizon is selected so that a computation time associated with multivariable and multistage optimization is smaller than an allowed computation time.

15. The controller of claim 14, wherein the allowed computation time is equal to a sampling period associated with the controller.

16. The controller of claim 1 further caused to impose non-anticipativity constraints to obtain decisions that are only based on measurements that have realized before the occurrence of the decisions.

17. The controller of claim 16, wherein the non-anticipativity constraints are configured to reduce number of variables in the multivariable and multistage optimization.

18. The controller of claim 1 wherein the constraints include constraints on the operation of the vehicle and probabilistic constraints relating the vehicle and the environment, wherein at least one of the constraints is a collision avoidance constraint avoiding collision with one of the moving obstacles wherein the moving obstacle is represented by a convex shape.

19. The controller of claim 18, wherein the controller is caused to convexify the collision avoidance constraint by a linear stochastic constraint separating an obstacle from a current vehicle position.

20. The controller of claim 19, wherein the linear stochastic constraint is constructed by:
   determining a first point on the border of the convex shape of the obstacle;
   determining a tangent plane to the obstacle shape at the first point;
   constructing a linear constraint that imposes the vehicle to remain on the same side of the constraint along the prediction horizon; and
   adding the uncertainty to the estimate of the obstacle state as uncertainty to the linear constraint.

* * * * *